(12) United States Patent
Schwartz et al.

(10) Patent No.: US 11,540,083 B1
(45) Date of Patent: Dec. 27, 2022

(54) METHOD AND APPARATUS FOR ADAPTIVE LOCATION DETERMINATION

(71) Applicant: GigFlex LLC, Plano, TX (US)

(72) Inventors: Larry S. Schwartz, Montgomery, OH (US); Mitesh D. Desai, Plano, TX (US)

(73) Assignee: GigFlex LLC, Plano, TX (US)

( * ) Notice: Subject to any disclaimer, the term of this patent is extended or adjusted under 35 U.S.C. 154(b) by 0 days.

(21) Appl. No.: 17/696,382

(22) Filed: Mar. 16, 2022

Related U.S. Application Data

(60) Provisional application No. 63/207,718, filed on Mar. 16, 2021.

(51) Int. Cl.
*H04W 4/021* (2018.01)
*H04W 64/00* (2009.01)
*H04W 4/029* (2018.01)

(52) U.S. Cl.
CPC .......... *H04W 4/021* (2013.01); *H04W 4/029* (2018.02); *H04W 64/003* (2013.01)

(58) Field of Classification Search
CPC ..... H04W 4/021; H04W 4/023; H04W 4/025; H04W 4/029; H04W 64/003; H04W 64/006
See application file for complete search history.

(56) References Cited

U.S. PATENT DOCUMENTS

| | | | | |
|---|---|---|---|---|
| 8,984,445 B1* | 3/2015 | Bailiang | ............ | G06F 16/9537 701/445 |
| 9,279,694 B1* | 3/2016 | Sheikh | ............... | G01C 21/3667 |
| 9,648,450 B2* | 5/2017 | Egan | ........................ | H04W 4/80 |
| 2003/0087648 A1* | 5/2003 | Mezhvinsky | ........... | H04W 4/02 455/445 |
| 2004/0181340 A1* | 9/2004 | Smith | ................... | H04W 4/029 702/3 |
| 2004/0199631 A1* | 10/2004 | Natsume | ............... | H04L 69/329 709/225 |
| 2008/0254810 A1* | 10/2008 | Fok | ........................ | G01S 5/0009 455/456.2 |
| 2010/0121717 A1* | 5/2010 | Chen | ...................... | G01C 21/26 705/14.58 |
| 2013/0162481 A1* | 6/2013 | Parvizi | .................. | G01S 5/0205 342/452 |
| 2014/0228054 A1* | 8/2014 | Rose | ..................... | H04W 4/024 455/456.3 |
| 2014/0368601 A1* | 12/2014 | deCharms | .............. | H04N 7/147 348/14.02 |
| 2016/0219398 A1* | 7/2016 | Kamensky | ............ | H04W 4/029 |

(Continued)

*Primary Examiner* — Jean A Gelin
(74) *Attorney, Agent, or Firm* — Frost Brown Todd LLC

(57) ABSTRACT

Locations for mobile computers may be adaptively determined in a system which includes a server, a set of mobile computers, and an administrator computer. In such a system, the set of mobile computers may each be programmed with instructions operable to, when executed, transmit multiple forms of location information to the server. Additionally, the server may be programmed with a set of location determination routines and these routines may be used in determining a location for each of the mobile computers from the set of mobile computers. These locations may then be used to populate an interface of the administrator computer with icons at positions corresponding to the mobile computers' locations.

20 Claims, 20 Drawing Sheets

(56) References Cited

U.S. PATENT DOCUMENTS

| | | | |
|---|---|---|---|
| 2016/0249170 A1* | 8/2016 | Freeland | G06F 16/258 |
| 2016/0316031 A1* | 10/2016 | Diem | H04L 67/54 |
| 2017/0146349 A1* | 5/2017 | Yang | H04W 4/027 |
| 2020/0106877 A1* | 4/2020 | Ledvina | H04M 1/72436 |
| 2020/0359170 A1* | 11/2020 | Werner | G06F 16/9537 |
| 2021/0009055 A1* | 1/2021 | Brown | G07C 5/08 |
| 2022/0140924 A1* | 5/2022 | Ahmed | H04W 4/029 370/329 |

* cited by examiner

METHOD AND APPARATUS FOR ADAPTIVE LOCATION DETERMINATION

CROSS REFERENCE TO RELATED APPLICATIONS

This is a non-provisional of, and claims the benefit of, U.S. provisional patent application 63/207,718, filed on Mar. 16, 2021, the entirety of which is hereby incorporated by reference.

FIELD

The technology disclosed herein can be applied to determining and presenting information regarding locations of mobile devices.

BACKGROUND

While location based services have become a fixture of modern life, the technology used for actually determining locations has a variety of drawbacks. For example, location based information obtained from a GPS receiver or similar device may be sufficient to determine the latitude and longitude of an entity of interest, but may not be able to provide other relevant information, such as elevation. Additionally, conventional localization technologies may suffer from availability issues, such as being unable to determine a location signal inside of a building. Additionally, even when a device's location can be determined, reference maps indicating the device's location in space may not match the semantic map of a user, significantly decreasing the efficiency of using electronic devices with location based services. Other drawbacks, such as a lack of integration between locational and temporal information also exist. Aspects of the technology disclosed herein may address one or more of these issues or realize one of more of the disclosed advantages.

SUMMARY

Examples disclosed herein are directed to techniques for determining and applying locations for mobile computers. For example, disclosed herein is a system comprising a server, a set of mobile computers, and an administrator computer. In such a system, each of the mobile computers may be programmed with instructions operable to, when executed, transmit multiple forms of location information to the server. In such a system, the server may be programmed with a set of location determination routines and instructions operable to, when executed, determine a location for each mobile computer from the set of mobile computers and send data to the administrator computer operable to cause the administrator computer to present a map with a set of icons. In such a system, for each of the mobile computers, determining the location for that mobile computer may comprise identifying an applicable location determination routine from the set of location determination routines and determining the location for that mobile computer using the applicable location determination routine. In such a system, for each icon with which the map would be presented on the administrator computer, that icon may correspond to a mobile computer from the set of mobile computers and may be displayed on the map at a position corresponding to the location determined for that icon's corresponding mobile computer.

Other features and aspects of the disclosed technology will become apparent from the following detailed description, taken in conjunction with the accompanying drawings, which illustrate, by way of example, certain features in accordance with examples of the disclosed technology. The summary is not intended to limit the scope of any protection provided by this document or any related document, which scope is defined by the respective document's claims and equivalents.

It should be appreciated that all combinations of the foregoing and following concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The drawings and detailed description which follow are intended to be merely illustrative and are not intended to limit the scope protection provided by this document or by any other document which claims the benefit of this document.

DETAILED DESCRIPTION

Disclosed herein is novel technology which can be used for a variety of purposes, including determining and providing interfaces incorporating the locations of mobile devices. For the purposes of illustration, this disclosure describes embodiments of certain aspects of the disclosed technology as it can be applied to tracking and displaying interfaces with information on mobile devices in the context of events or service provision. However, it should be understood that this description is intended to be illustrative only, and that the disclosed technology can be applied in other contexts, and in other manners, as well. Accordingly, the description of certain embodiments and applications set forth herein should not be treated as limiting on the scope of protection provided by this or any related document.

Figure 1:
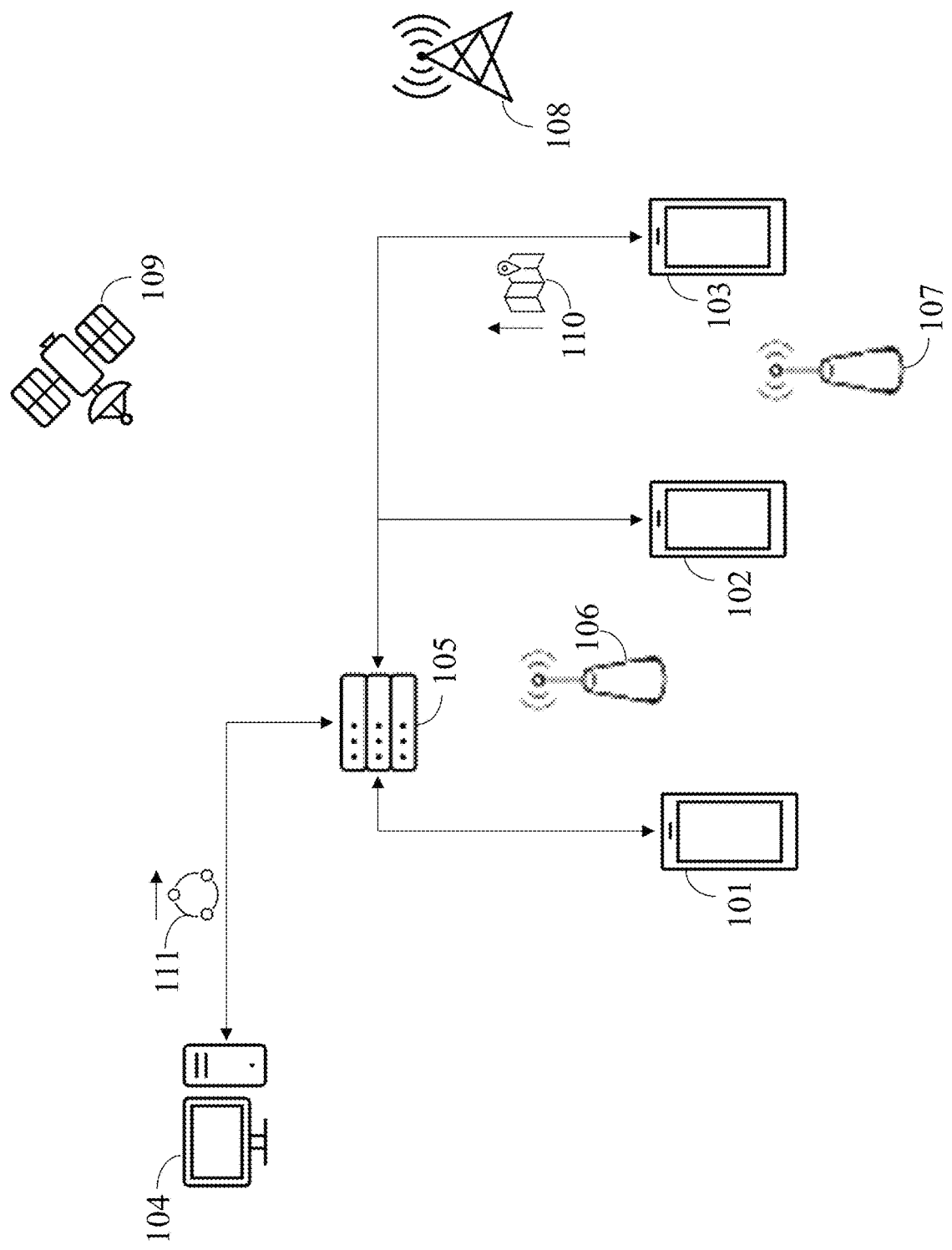
FIG. 1 depicts a high level architecture which could be used when implementing aspects of this disclosure.

Turning now to the figures, FIG. 1 illustrates a high level architecture in which aspects of the disclosed technology may be deployed. In the architecture of FIG. 1, a plurality of mobile computers 101 102 103 and an administrator computer 104 are each communicatively connected to a server 105. The architecture of FIG. 1 also includes a plurality of wireless network stations, such as WiFi network stations 106 107 or cellular tower 108. In operation, the mobile computes 101 102 103 may be programmed to use information regarding the wireless network stations 106 107 108 to determine their locations, such as through cellular or WiFi triangulation. Similarly, in some implementations, the mobile computers 101 102 103 may be configured to determine their locations in other ways, such as using signals transmitted from GPS satellites 109. However they are derived, these automatically determined locations 110 may then be sent to the server 105 as location information. The server 105 may also send information to the mobile computers 101 102 103, which may include data defined at an administrator computer 104 (e.g., geofences 111, as described in more detail herein), or alerts or other messages that could be automatically generated by the server 105 itself.

These communications and interactions may be organized and supported in a variety of ways. For example, in some implementations, the mobile computers 101 102 103 and administrator computer 104 may each have specialized computer programs installed locally to configure them to communicate with the server 105, which computer programs may receive data from the server 105 and reformat or process that data for presentation to a user. Such a program may also be configured to process data received from the server 105, received from a user, or generated by the device on which it resides (e.g., time or location data) to generate additional communications or take other actions as described herein. It is also possible that one or more mobile computers 101 102 103 and/or an administrator computer 104 may be configured to communicate with a server 105 through a web browser rather than through a specialized computer program as described, and the server 105 may be configured to generate interfaces and responses based on browser requests (e.g., http GET or POST requests) received from mobile computers 101 102 103 or the administrator computer 104.

Hybrid systems are also possible. For example, in some implementations, mobile computers 101 102 103 may be configured with specialized computer programs downloaded from an app store, while an administrator computer 104 may communicate with a server 105 using a web browser. Other variations and combinations are also possible, and will be immediately apparent to those of ordinary skill in the art based on this disclosure. Accordingly, the description above of how communications may take place should be understood as being illustrative only, and should not be treated as limiting.

Figure 2:
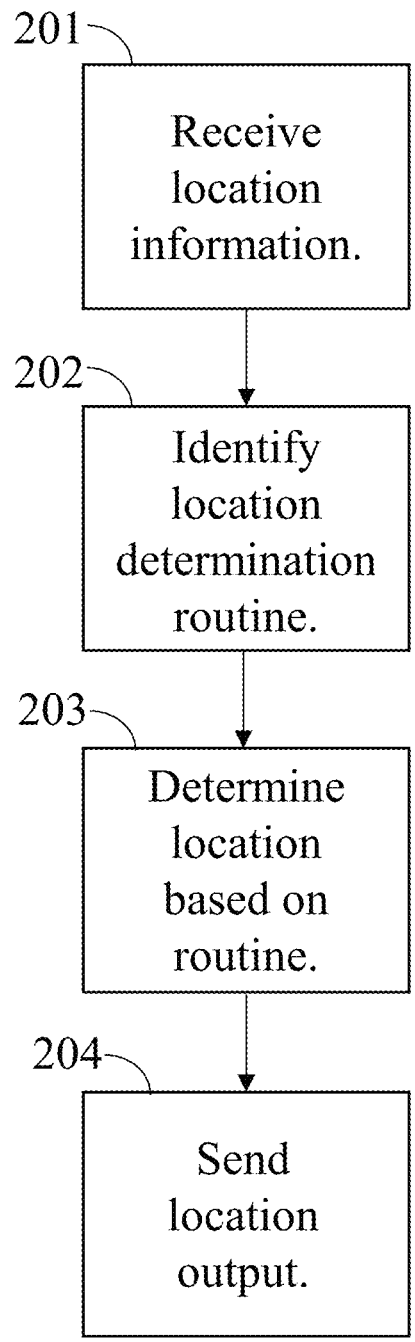
FIG. 2 illustrates a process which may be performed to provide location information.

Turning now to FIG. 2, that figure illustrates a process which may be performed by a server 105 in the architecture of FIG. 1 to provide location information to a user of the administrator computer 104. Initially, in the process of FIG. 2, the server would receive 201 location information from one of the mobile computers. This may be done, for example, by a mobile computer sending a locally determined location (e.g., a location determined by that mobile computer using a GPS receiver or through triangulation of wireless signals) to the server 105. However, other approaches are also possible. For example, in some cases, the mobile computers 101 102 103 may be located in a setting where there are markers (e.g., QR codes, bar codes, RFID tags) present at certain predefined locations. In such a case, the server 105 may receive 201 location information through the mobile computer scanning or taking a picture of the marker and sending the picture and/or scanned information to the server 105. Combined approaches are also possible. For example, in some cases a mobile computer may send both information from a marker and one or more locally determined locations, either together or separately.

Figure 3:
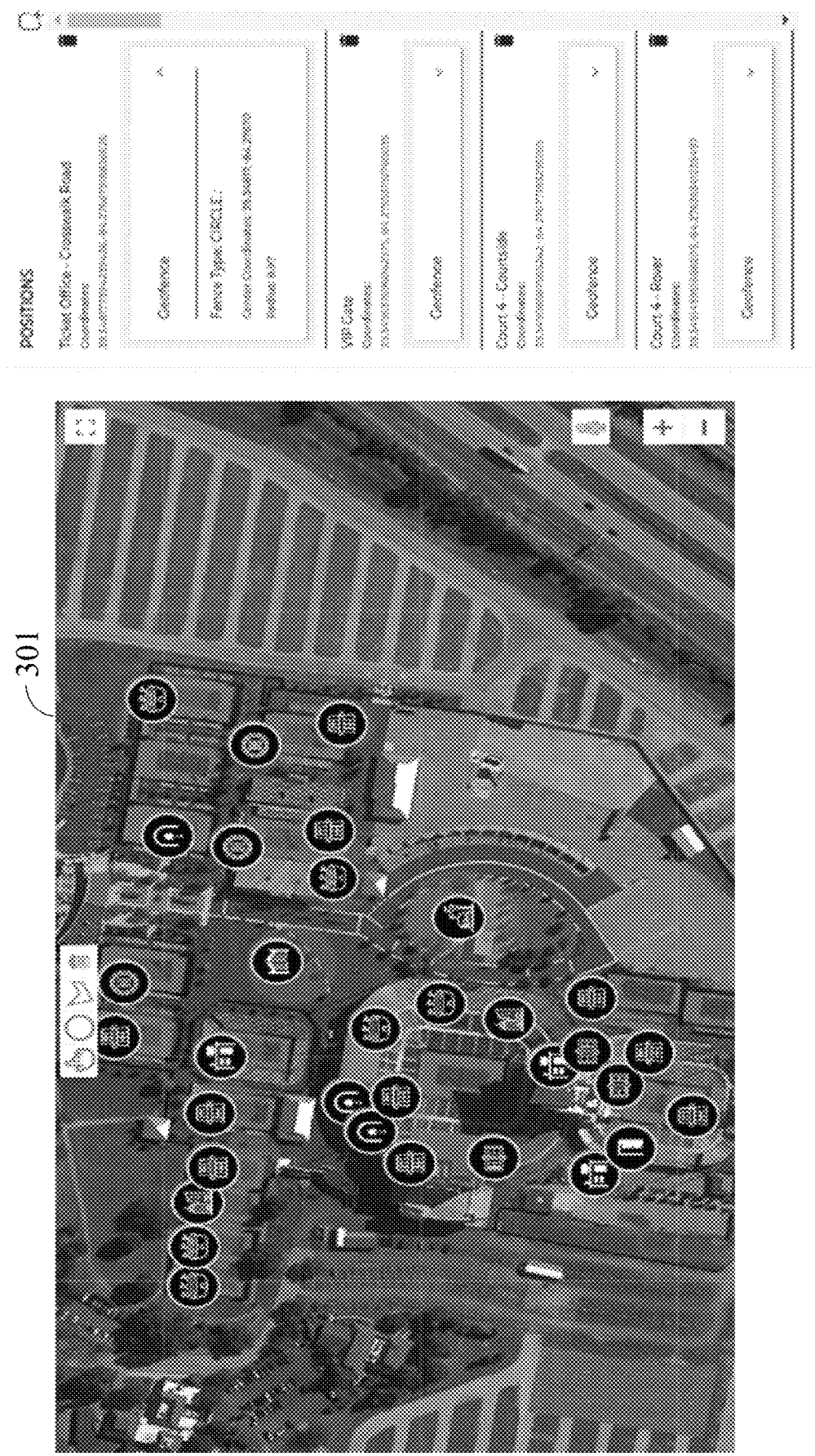
FIG. 3 an interface which may be used to organize a location into a plurality of sublocations.

However it was received, in the method of FIG. 2, once the location information is received 201, the server 105 may use that information to identify 202 a location determination routine. To illustrate how this may take place, consider FIG. 3, which illustrates an interface which a user of an administrator computer 104 may use to organize an overall location (e.g., a sporting venue) into a plurality of sublocations (e.g., ticket office, VIP gate, etc.). In the interface of FIG. 3, a reference map 301 (e.g., a satellite map) is presented which depicts a sporting venue and its surrounding region. Within that reference map, the user of the administrator computer 104 may be allowed to define various locations of interest, such as food courts, gates, tennis courts, etc. by specifying a point corresponding to that location, and may also be allowed to define information which could be used to determine if a mobile computer was present at the location. For example, a user of the administrator computer 104 may be allowed to define geofences corresponding to the locations of interest, or QR codes or other markers that had been placed at the locations of interest that a user of a mobile computer could scan to indicate their presence.

In an embodiment which supports locations of interest such as shown in FIG. 3, a user of an administrator computer 104 may, either in addition to or as an alternative to defining the locations themselves, be allowed to determine logic which could be used to identify if a mobile computer was present at a particular location. For example, in an embodiment in which a location of interest could be associated with a geofenced area and/or a QR code or other marker, a user of an administrator computer may be allowed, for each of the locations of interest, to define whether a mobile computer would be treated as present at that location using whether the mobile computer detected its location in the geofenced area (e.g., using a GPS receiver), whether the mobile computer had scanned the QR code or other marker, or through some combination of the two. This may be done by allowing the user to define the logic directly (e.g., using a rules engine interface which would allow the logic to be defined using Boolean operators such as AND, OR and NOT), or by assigning a location to one of a set of predefined location determination classes. For instance, in some cases, a user of an administrator computer 104 may be allowed to assign locations of interest to the location determination classes set forth below in table 1.

TABLE 1

Exemplary location determination classes

| Location Determination Class | Location Determination Logic |
| --- | --- |
| Location Only | A mobile computer is identified as being at this location if it identifies itself as being within a geofenced region associated with this location (e.g., through GPS or wireless triangulation). |
| Location + Code | A mobile computer is identified as being at this location if it identifies itself as being within a geofenced region associated with this location OR if it scans a code associated with this location. |
| Code Only | A mobile computer is identified as being at this location if it scans a code associated with this location. |

In an embodiment which supports location based location determination logic the step of identifying 202 a location determination routine in a method such as shown in FIG. 2 may be performed by using the previously received 201 location information to identify a location of interest, and then identifying 202 the location determination logic associated with that location as the location determination routine. However, it should be understood that other approaches may also, or alternatively, be used in some embodiments. For example, in some cases the location determination routine may be identified 202 based on what approach to determining location is most likely to be accurate in a given circumstance. For example, in a case where a method such as shown in FIG. 2 is performed at a time when weather conditions would interfere with one method of location determination (e.g., GPS location determination), the location determination routine may be identified 202 as a routine which would be less vulnerable to weather based disruption (e.g., marker based determination, or determination based on WiFi triangulation). Accordingly, the above description should be understood as being illustrative only, and should not be treated as limiting on the ways in which, in an embodiment which includes identifying 202 a location determination routine, identification 202 of a location determination routine could be performed.

In the method of FIG. 2, once a location determination routine has been identified 202, the location of the mobile computer may be determined 203 using that routine. In some cases this may be done simply by applying the logic associated with that routine to confirm a mobile computer's presence at a particular location of interest. However, other approaches are also possible. For example, in some cases, a system implemented based on this disclosure may be programmed to identify and resolve location conflicts when determining 203 the mobile computer's location. An exemplary method which may be used in this type of conflict detection and resolution is described below in the context of FIG. 4.

Figure 4:
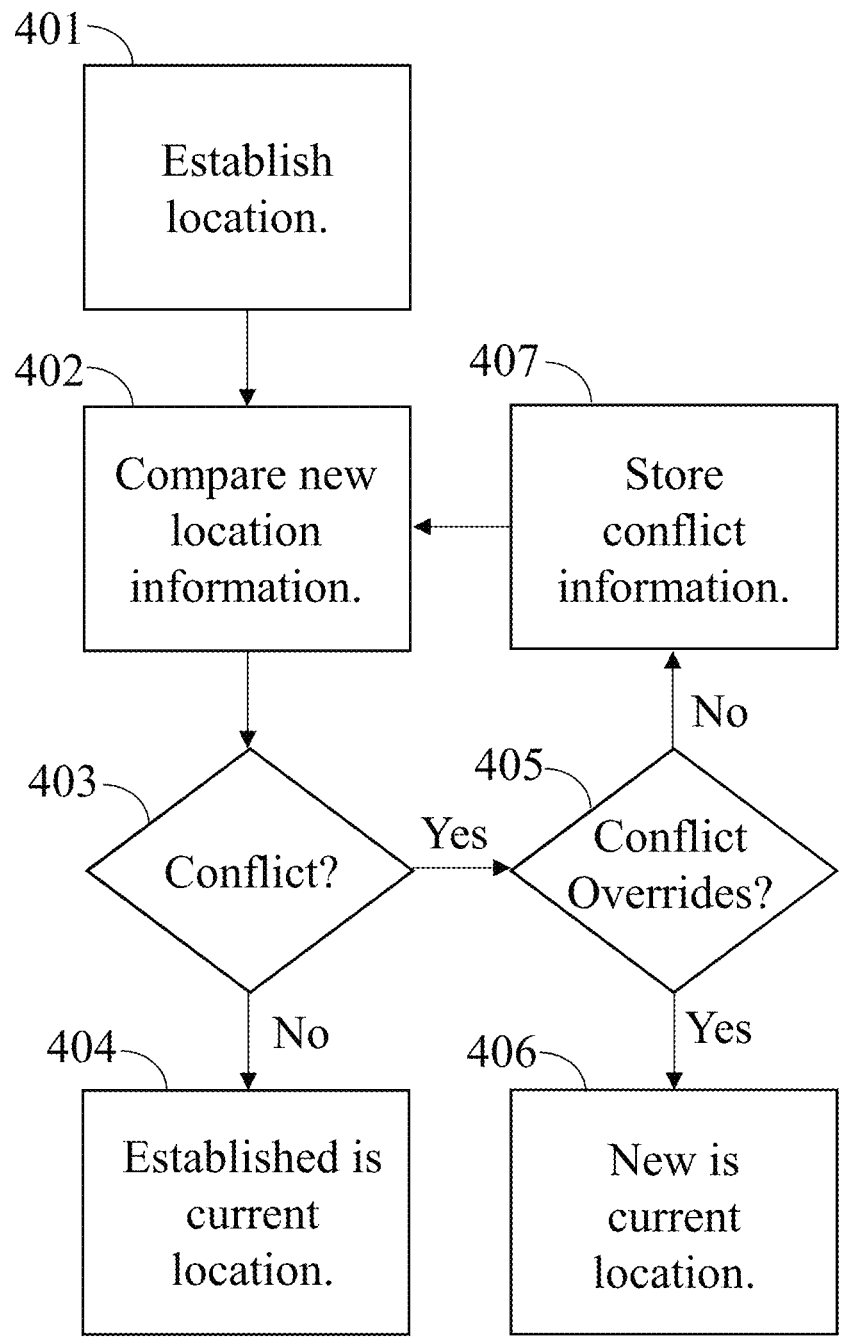
FIG. 4 illustrates a process which may be used to detect and resolve conflicts in location information.

In the method of FIG. 4, initially a location will be established 401 for a mobile computer. This may be done, for example, by an individual taking that mobile computer and using it to scan a QR code or other marker, thereby establishing 401 his or her presence at the corresponding location. Subsequently, as new location information is received, it could be compared 402 with the previous established location. For example, in a case where a mobile computer was programmed to periodically send its locally determined (e.g., using a GPS receiver) location to a server 105 the server could compare 402 this location with the location that had previously been established 401. Based on this comparison 402, the server 105 could determine 403 whether there was a conflict between the location indicated in the new location information and the previously established location. If there was not a conflict (e.g., if the locally determined location was within a geofenced area that corresponded to the same point of interest as the QR code that had been scanned previously to establish 401 the location), then the server 105 could simply continue to treat 404 the established location as the current location for the mobile computer. Alternatively, if there was a conflict, then the method of FIG. 4 may proceed with determining how that conflict should be resolved.

In a method such as shown in FIG. 4, when it was determined 403 that there was a conflict between locations, a second determination 405 may be made as to whether the conflicting new location should be treated as overriding the previously established 401 location. To illustrate how this second determination 405 may be performed, consider a case in which the disclosed technology was used to track personnel by a company that had a policy requiring someone who establishes their location by scanning a QR code to rescan that QR code as a sign out mechanism when their assignment at the previously established location was complete. In such a case, if an employee scanned a QR code to establish their presence at a first location, and then left that location for another location without signing out, location signals sent to the server by a mobile computer carried by that employee (e.g., a phone with a GPS receiver) could indicate that the employee was at a location different from the location previously established by scanning (and not rescanning) the QR code. In this scenario, a server may be configured with logic that would balance the reliability against the recency of the various location signals when determining 405 if the conflicting location indicated by the new signals should override the previously established location. For example, such a server may have a rule which indicates that, when a location signal is scanning a QR code or other marker, that signal should always override any previous signals, because the likelihood of it being erroneous is low. On the other hand, there may be a rule that for conflicting location information determined on a mobile computer (e.g., using a GPS receiver or wireless triangulation) to override a location previously established by a QR code or other marker, there would need to be multiple readings in the new location before it would be treated as overriding the previously established location. Thus, in determining 405 whether conflicting information should override the previously established location, a server could determine if that conflicting information, together with any previously stored information (e.g., other conflicting location information) was sufficient to satisfy the applicable override logic. If it was, then the new location indicated by the conflicting location information could be set 406 as the mobile computer's location. Alternatively, if the conflicting location information was not sufficient to satisfy the override logic, then it could be stored 407 for use in further determinations, and the method could wait for new location information to be received so that it could be compared 402 and processed in a manner similar to that described above.

It should be understood that, while FIG. 4 illustrated a method which may be used in detecting and resolving location conflicts, it is possible that some embodiments which include conflict detection and resolution features may implement those features in manners that differ from what was described above. To illustrate, consider the treatment of conflicting location information. In some cases, once either a new or previously established identified location is set 404 406 as the current location following a conflict, information stored 407 regarding that conflict and/or the previous location may be deleted. However, in other cases that information may be retained and/or used for various purposes (e.g., if a user of a mobile computer was detected as being in a new location without rescanning a QR code to sign out of a previous location, the previous location may be used to send a reminder to the user that they need to sign out and/or return to the previous location). Similarly, in some cases, if non-conflicting location information was received, then previously stored 407 conflicting location information may be discarded. However, in other cases there may be separate logic for determining if previously stored 407 conflicting location information should be discarded (e.g., logic requiring receipt of multiple pieces of non-conflicting location information), so as to avoid the conflict detection and resolution scheme being undermined by spurious data. Other modifications and variations are also present, and will be immediately apparent to those of skill in the art in light of this disclosure. Accordingly, the description of conflict detection and resolution set forth above in the context of FIG. 4 should be understood as being illustrative only, and should not be treated as limiting.

Returning now to the discussion of FIG. 2, after the location had been determined 203, it could be used to generate and send 204 a location based output, either to the administrator computer 104, a mobile computer, or both. For example, in a case where the disclosed technology was used to track locations of personnel, the location information may be used to populate a map (e.g., a reference map such as shown in the interface of FIG. 3) with icons corresponding to the personnel being tracked so that a user of the administrator computer 104 could have real time information regarding the locations of the individuals he or she was monitoring. This type of tracking interface may be implemented in various manners. For example, in some embodiments a map interface may show icons corresponding to personnel with mobile computers at real locations on the map (e.g., at actual latitude and longitude coordinates on the map as determined by a GPS receiver or wireless triangulation routine on a mobile computer). Alternatively, in some embodiments a map interface may show icons corresponding to personnel with mobile computers at predefined locations. For instance, if a map was organized into locations of interest, then an icon for any mobile computer determined to be at a location of interest could be displayed at a predefined point in that location of interest (e.g., at the center of a geofenced area, at a point specified when the location of interest was defined, etc.) regardless of where in the location of interest that mobile computer was actually located.

Figure 5:
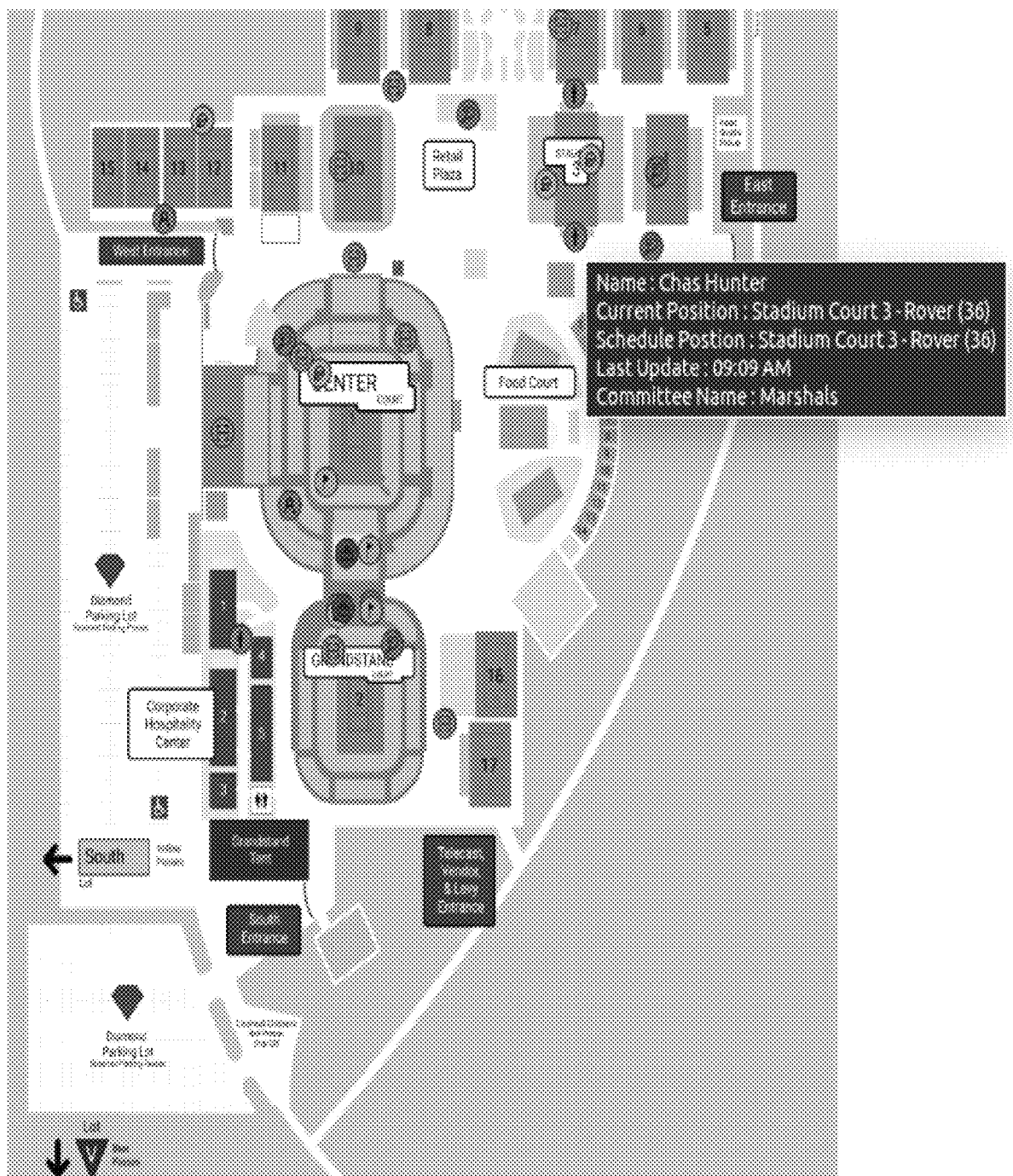
FIG. 5 illustrates an interface which may be presented to an administrator showing information about a particular individual associated with a location on a semantic map.
Figure 6:
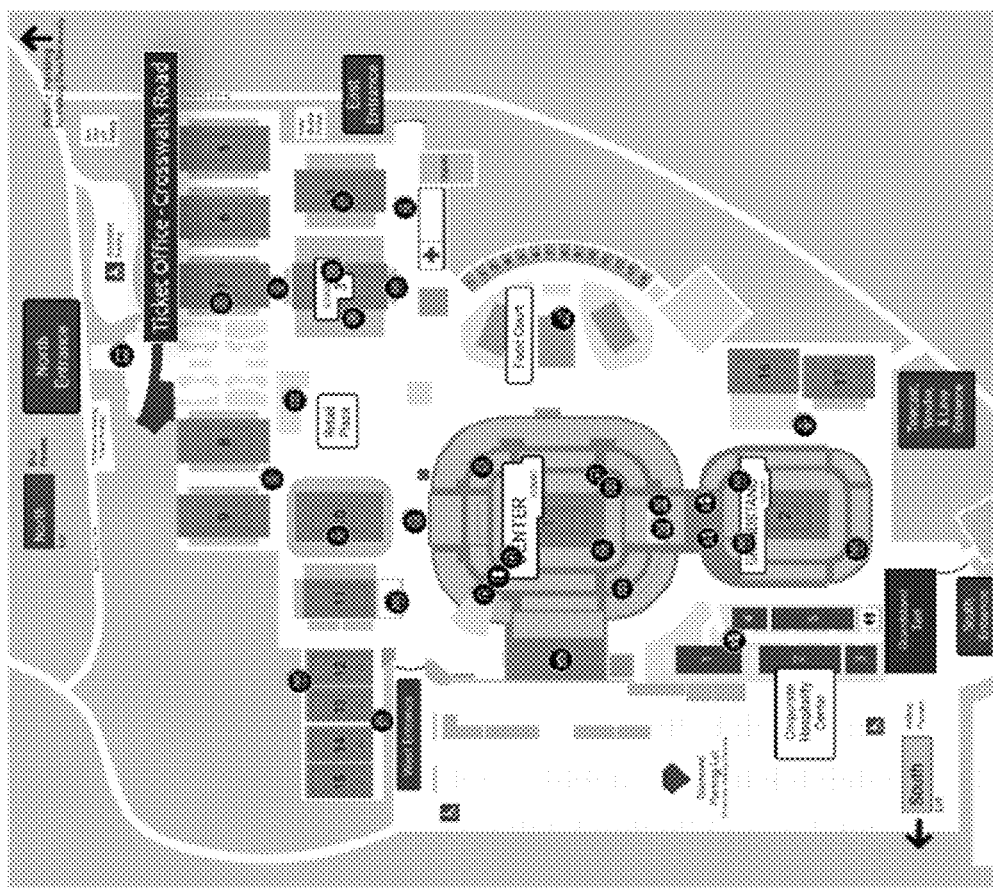
FIG. 6 illustrates an interface which may be presented showing an administrator a semantic map.

Variations beyond how a map may be populated with icons are also possible. For example, in some embodiments, either in addition to, or as an alternative to presenting icons on a reference map such as shown in FIG. 3, location information may be used to populate a corresponding semantic map 501 such as shown in FIG. 5. As can be seen by comparing the semantic map 501 of FIG. 5 with the reference map 301 of FIG. 3, a semantic map may display the same location as a reference map, but they not be displayed in the same relative locations, or have the same relative sizes, shapes or orientations as their representations in the reference map. In an embodiment which provides a semantic map such as shown in FIG. 5, icons representing mobile computers (or personnel being tracked using those mobile computers) may be displayed at predefined points in the locations where they are detected, in a manner similar to that described above in the context of populating reference maps. To support this, a user of an administrator computer 104 may be allowed to use an interface such as shown in FIG. 6 to define an XY coordinate on the semantic map for each of the locations of interest on a corresponding reference map. A user may then subsequently be allowed to switch between semantic and reference map interfaces, thereby enabling him or her to use whatever interface was most appropriate to understanding and accessing the information which was relevant to his or her then current task.

Additional variations on map interfaces which may be presented in some embodiments are also possible and may be supported in some cases. For example, in some cases, there may be multiple levels defined for various locations of interest, such as locations of different floors of a building. In such as case, in addition to, or as an alternative to, allowing a user to switch between semantic and reference maps, the user may also be allowed to switch between semantic maps representing different levels and showing locations of interest on those particular levels. As another example, in some cases, a semantic map may be presented which displays locations of interest from multiple levels simultaneously, such as by displaying representations of different levels next to each other.

Figure 7:
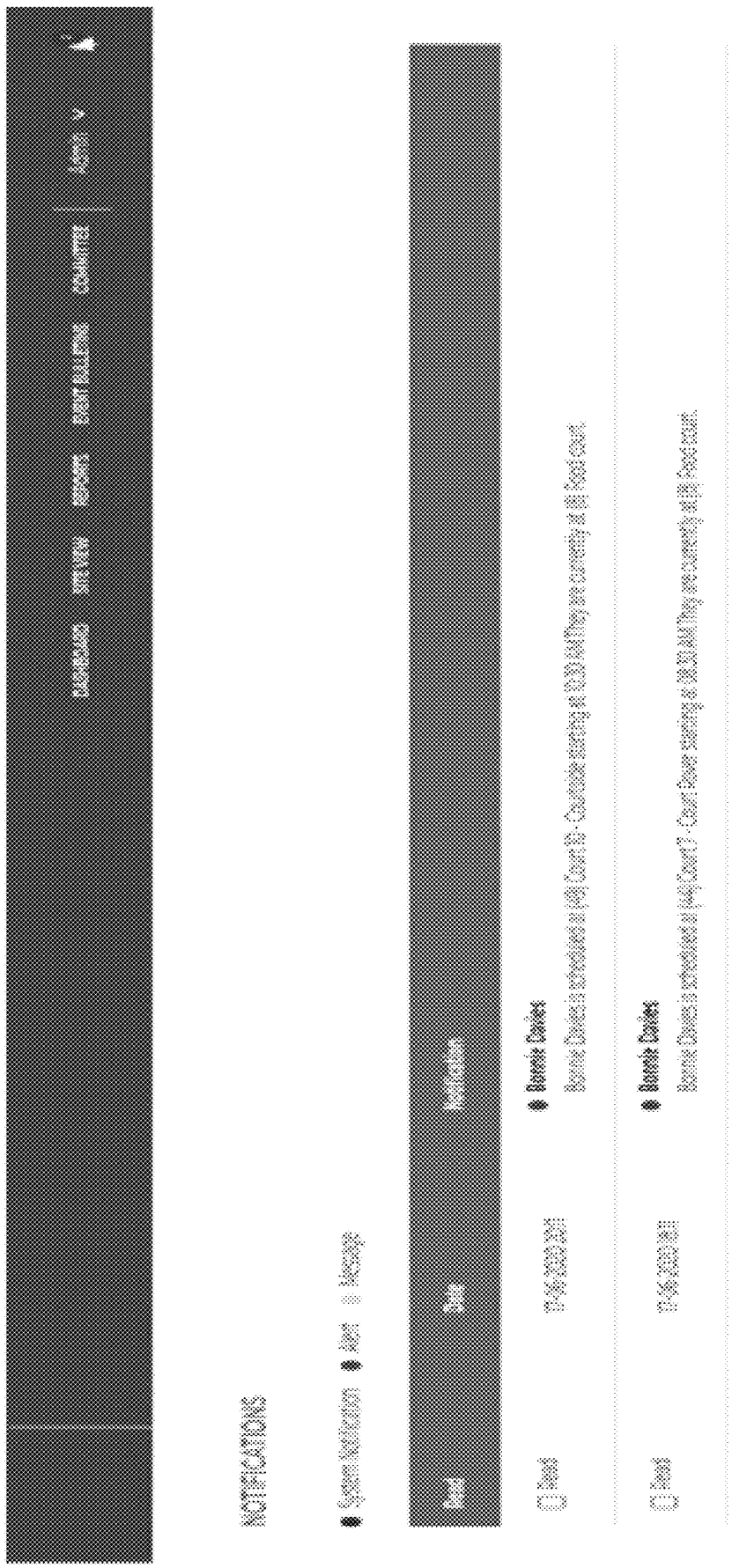
FIG. 7 illustrates an interface that could be presented to an administrator to inform him or her of situations which are, or may become, out of compliance with an assigned schedule.

Of course, it should be understood that sending 204 location outputs may comprise providing information which would populate map interface such as the reference or semantic map interfaces discussed above, location information may also, or alternatively, be used to populate non-map interfaces as well. For example, FIG. 7 illustrates an interface that could be presented to a user of an administrator computer to inform him or her of situations which are, or may become, out of compliance with an assigned schedule. This may be supported, for example, by a server 105 maintaining schedules indicating locations where personnel associated with mobile computers 101 102 103 were assigned to be at particular times. In such an embodiment, the locations required by this schedule information may be compared with location information determined as described above, potentially in combination with transit time information (e.g., walking time to move between locations of interest) to automatically generate notifications for an administrator as needed so (e.g., as shown in the interface of FIG. 7) that he or she could take appropriate actions to remedy or prevent a schedule failure.

Figure 8:
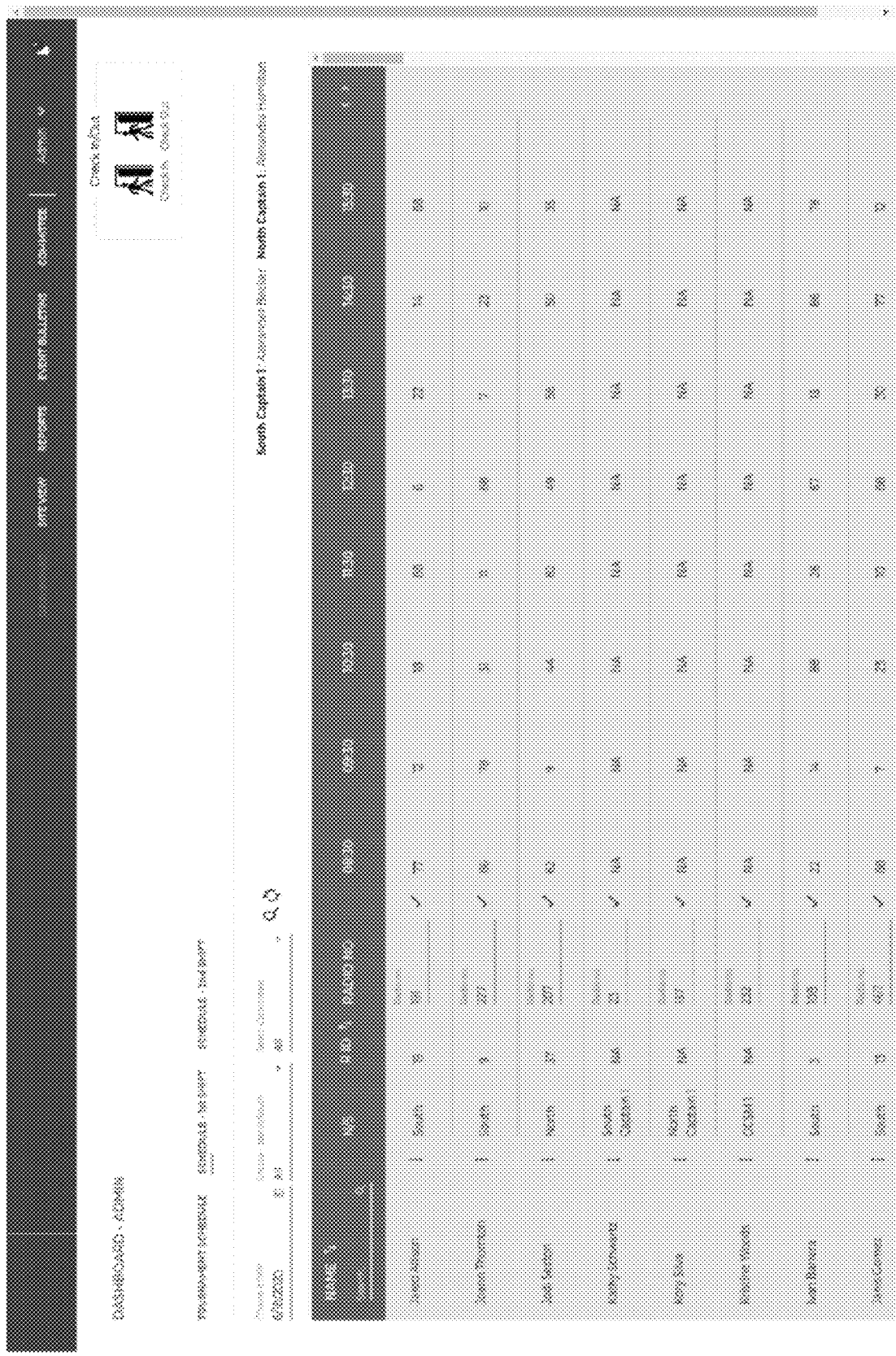
FIG. 8 illustrates an interface which may be presented to an administrator allowing the administrator to see personnel assignments across a particular event.
Figure 9:
FIG. 9 illustrates an interface that may be presented to an administrator showing roles associated with icons such as could be illustrated in a semantic or reference map.

Additional interfaces may also be provided to support functionality such as described above. For example, FIG. 8 illustrates an interface which may be presented to a user of an administrator computer allowing him or her to see personnel assignments across a particular event, on particular periods (e.g., shifts) during the event, correlations between particular personnel and radios (or other mobile computers) that had been assigned to them, and position identifications (e.g., as could be identified on a reference map and later mapped to a semantic map such as a simplified site map) corresponding to locations that particular individuals were assigned to at particular times. FIG. 9 illustrates an interface that may be presented to an administrator showing roles associated with icons such as could be illustrated in a semantic or reference map like those shown in FIGS. 3, 5 and 6. In some implementations, such an interface may allow a user of an administrator computer to define or change icons or roles. Such a user may also be able to use an interface such as shown in FIG. 9 to verify that certain roles (e.g., chairperson roles) have been filled, or to see all of the individuals assigned to a particular role. Changes made in such an interface may then be propagated back through a server 105 such as that shown in FIG. 1 to update all interfaces shown on the various devices which would be impacted by the changes (e.g., devices showing reference or sematic maps displaying icons that may have been updated).

As noted above, the disclosed technology may be applied to purposes such as improving the tracking of locations through implementation of location determination methods such as illustrated and described in the context of FIGS. 2 and 4. However, in some embodiments, the disclosed technology may improve location tracking through methods other than location determination as described above. To illustrate, consider the issue of power consumption. As noted above, the disclosed technology may be used to determine locations based in whole or in part on location information transmitted from mobile devices to a server, and so some embodiments may include functionality to reduce unnecessary power consumption on the mobile computers so as to avoid inadvertently rendering such devices unable to perform their required functions. For example, in some cases, mobile computers may be programmed with applications which would include rules for selectively sending location information to the server so as to minimize the battery load imposed by such communications. Examples of such rules which may be present in some embodiments which support this functionality are provided below in table 2.

TABLE 2

Exemplary location information transmission rules

| Rule | Logic |
| --- | --- |
| Boundary crossing | Download definitions of geofenced areas associated with locations of interest and when a locally determined location (e.g., via GPS or wireless triangulation) indicates that a boundary of a geofenced area has been crossed, send the locally determined location to the server. |
| Marker | When a QR code or other marker is scanned, send the scanned information to the server as location information. |
| User input | When a user provides input which requires updating location (e.g., a command indicating that the user is signing in as having arrived at a location of interest), send location information to the server in accordance with the user input. |
| Distance traveled | If a locally determined location indicates that the user has moved a threshold amount since the last time location information was sent to the server, send the locally determined location to the server as an update. |
| Time non-compliant | If a locally determined location creates a conflict, either with a previously established location or with a schedule which had been downloaded showing where the user associated with the device was required to be located, periodically send locally determined location information to the server. |

Another example of additional functionality which may be provided in some embodiments is use of location information for documentation and/or reporting purposes. To illustrate, consider a situation in which the disclosed technology is used both to track locations and to establish records of presence. This may be done, for example, in a case where the disclosed technology was used in the management of security personnel. In such a case, geographic positions such as may be determined using GPS or wireless triangulation may be useful in tracking the physical movements of a security guard in real time or near real time while he or she was patrolling a predefined area. However, for establishing records confirming the guard's presence, rather than relying on GPS or wireless triangulation signals, the guard may be required to scan QR codes or other markers to provide timestamped affirmative indications of presence which could later be used for purposes such as documenting compliance in the event of a service audit. Similarly, in a case where the disclosed technology is used to manage personnel assigned to an event (e.g., a tennis event, such as shown in FIGS. 3 and 6-9), GPS or wireless triangulation information may be used to detect if there was a deviation from a required assignment, but signals from scanning a QR code or similar marker may be required for an individual to be treated as present at an assigned location.

Figure 10:
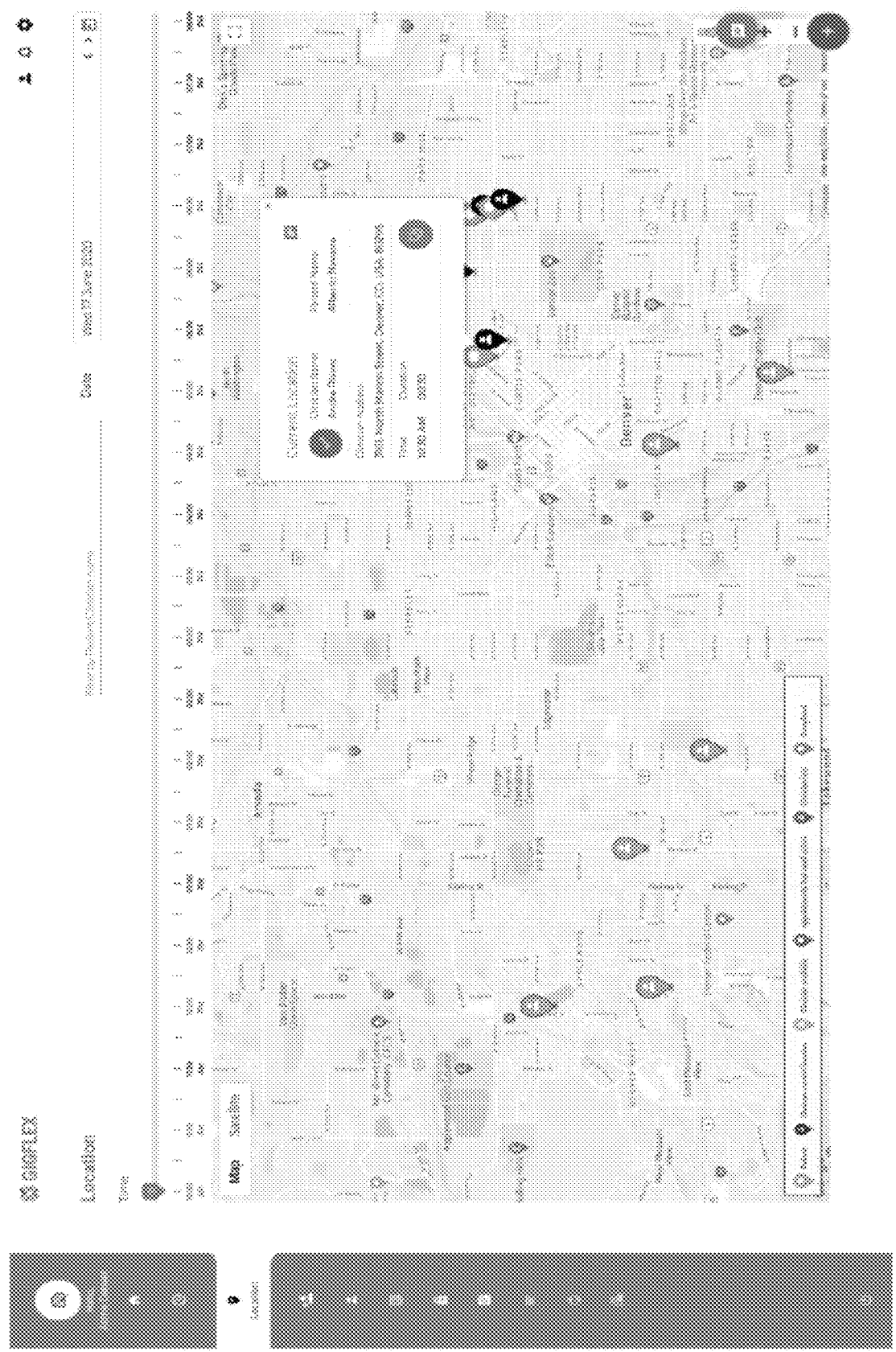
FIG. 10 illustrates an interface depicting a municipal service area in which a plurality of clinicians would operate to perform services for a plurality of patients at a plurality of locations.
Figure 11:
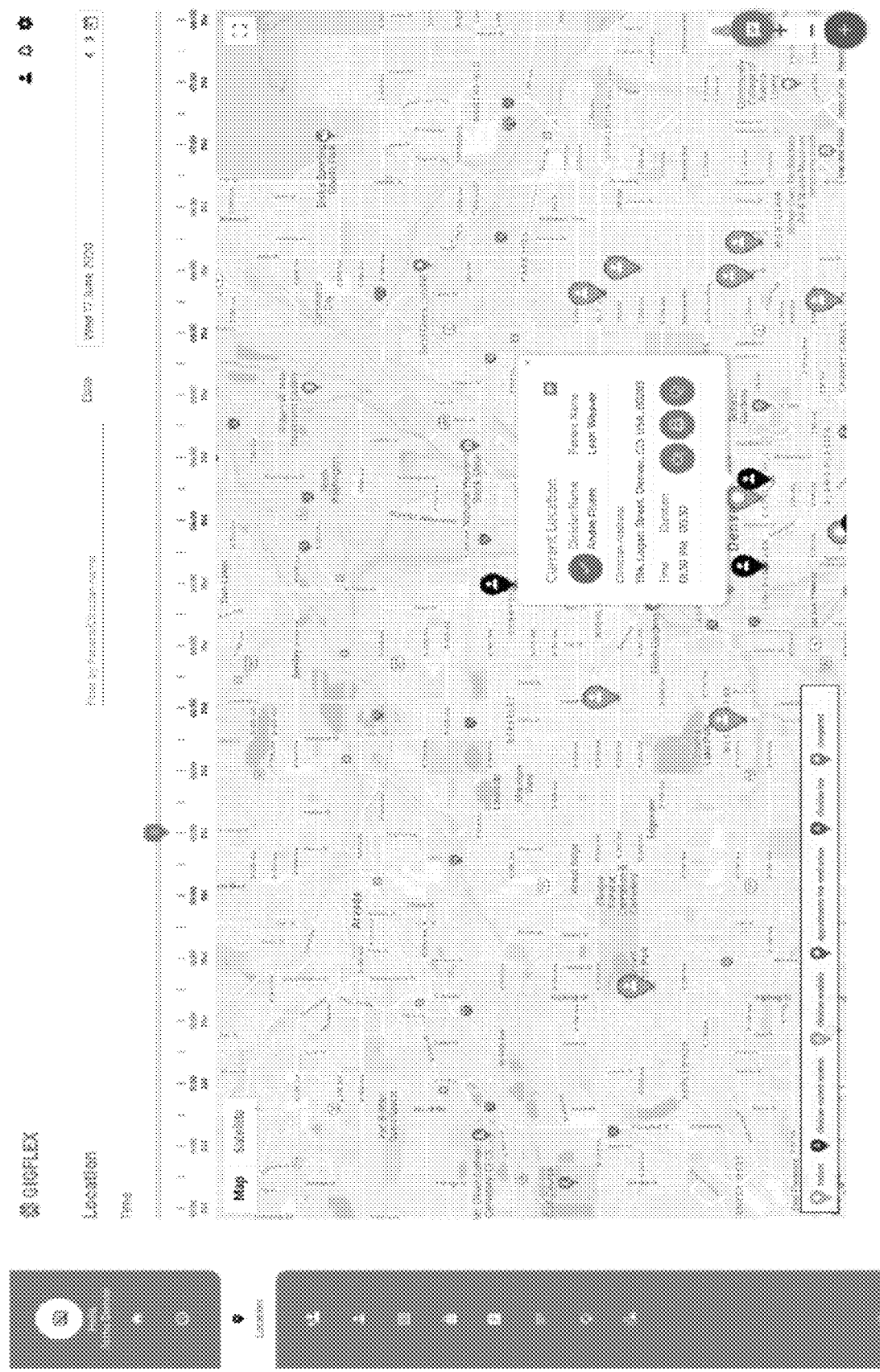
FIG. 11 illustrates an interface depicting a municipal service area in which a plurality of clinicians would operate to perform services for a plurality of patients at a plurality of locations.

Variations are also possible beyond the additions of functionality as described above. For example, while FIGS. 3 and 6-9 illustrated interfaces that may present an administrator with information relevant to a particular event, the disclosed technology may be applied on other contexts as well. To illustrate, FIGS. 10-20 show interfaces that may be presented to assist in satisfying various requirements at disparate geographic locations that are not associated with an event. For example, FIG. 10 illustrates a municipal service area in which a plurality of clinicians would operate to perform services for a plurality of patients at a plurality of locations. In some implementations, an interface such as shown in FIG. 10 would be presented to an administrator, who would have the ability to use a time slider or similar tool to visualize planned locations of various clinicians throughout a scheduled period, such as during a day or a shift. This type of temporal control is illustrated in FIG. 11, which shows how an interface such as that of FIG. 10 may change if the user moves a display time from the then current time (e.g., 10:30 am) to a time in the future (e.g., 1:30 pm).

Figure 12:
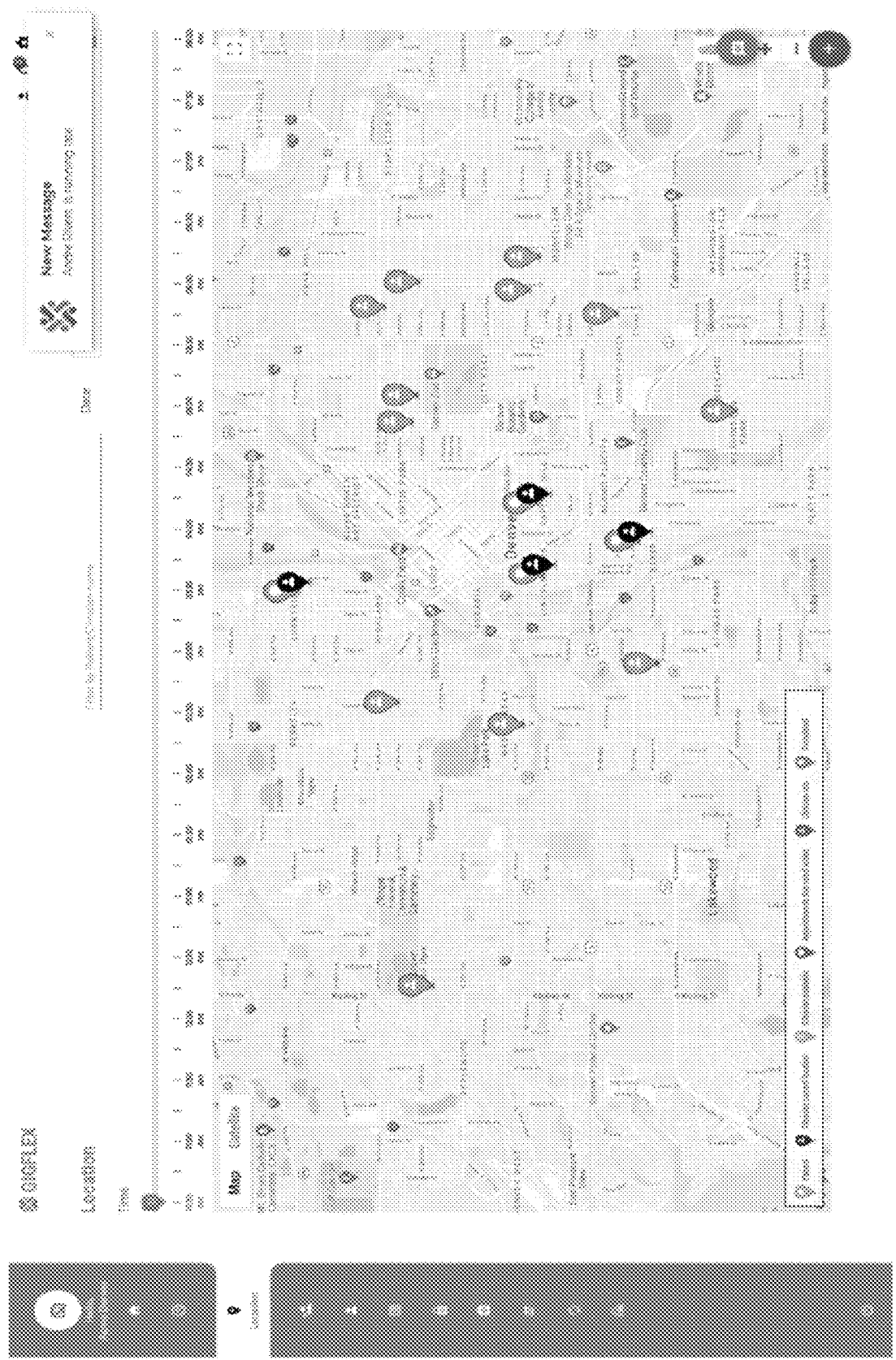
FIG. 12 illustrates an interface depicting a municipal service area along with a notification.
Figure 13:
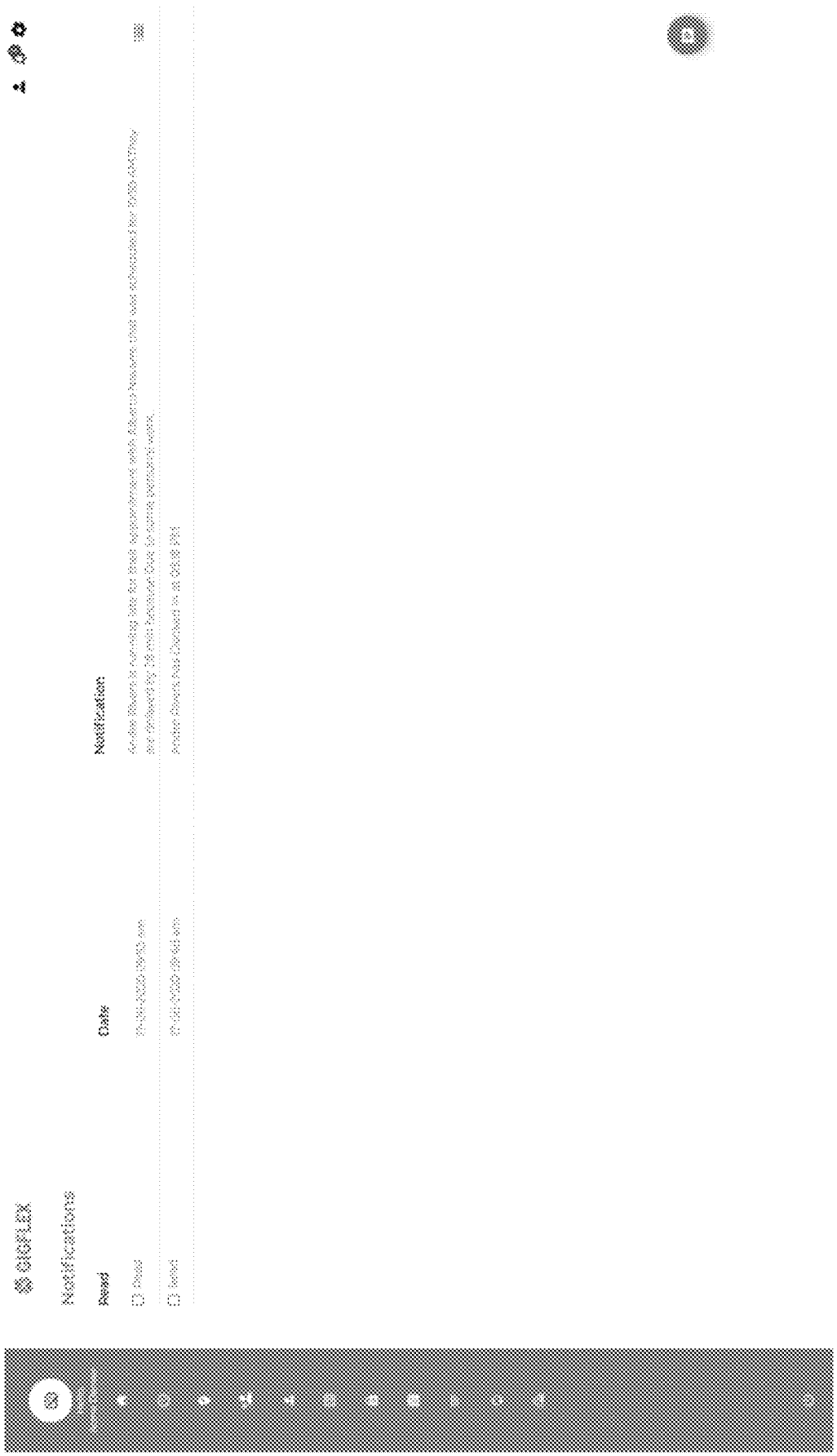
FIG. 13 illustrates an interface that may be presented to illustrate notifications.

FIG. 12 illustrates that, in some implementations, an interface such as shown in FIGS. 10 and 11 may be presented by a system which includes notification functionality such as described previously in the context of FIG. 7. FIG. 13 illustrates an interface that may be presented to illustrate notifications in a system implemented based on this disclosure. As illustrated in FIG. 13, such notifications may include exceptions (or potential exceptions) but may also include other relevant events, such as a clinician clocking in. This may be facilitated by configuring mobile computers used by clinicians with computer programs that allow the users of those devices to generate actions which may then be used to populate a notification interface such as shown in FIG. 13. For example, FIG. 14 illustrates an interface that may be displayed on a mobile device allowing its user to perform various actions, such as showing the route to their next appointment, calling the patient for their next appointment, or checking in to their next appointment.

Figure 14:
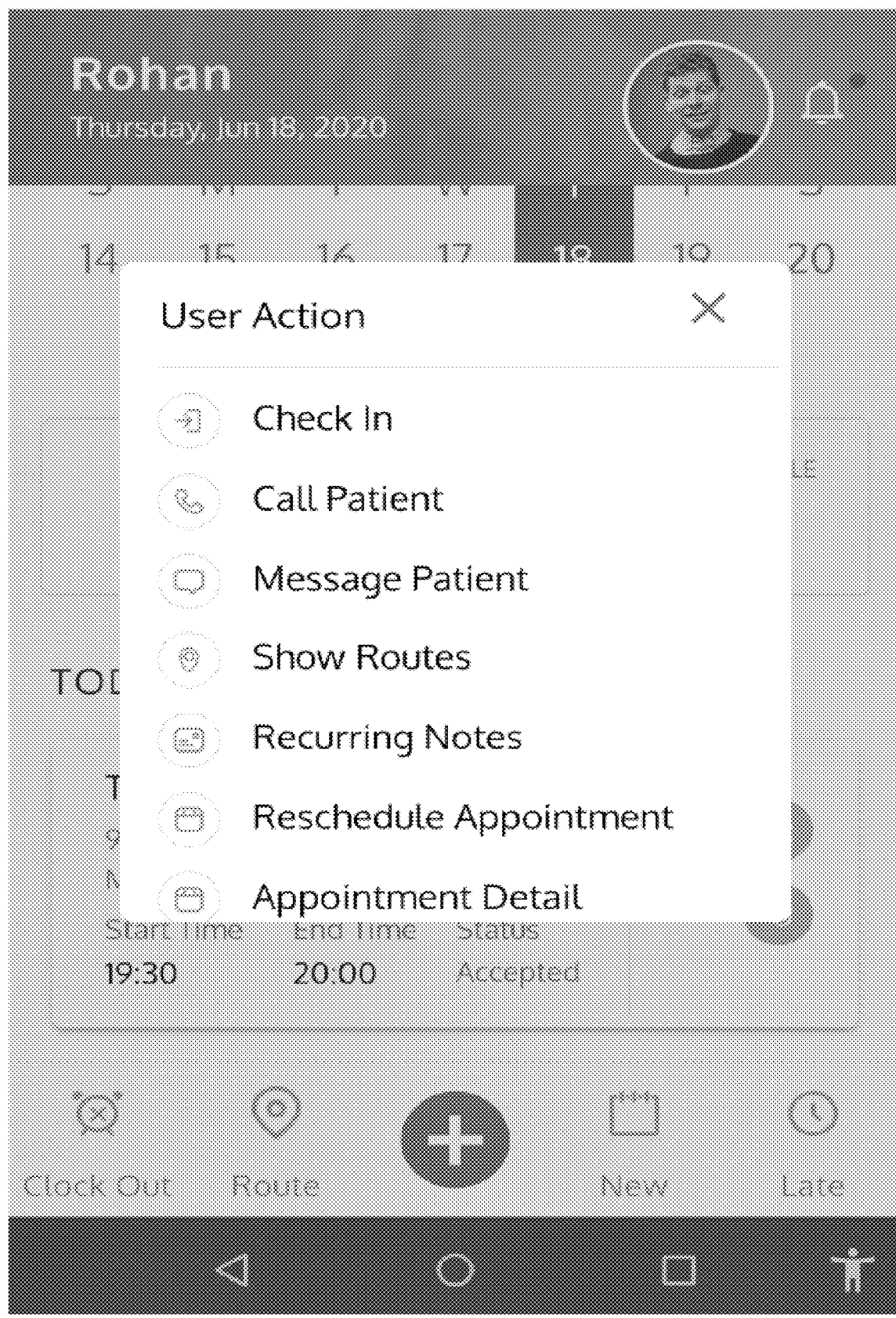
FIG. 14 illustrates an interface that may be displayed on a mobile device allowing its user to perform various actions.

In some implementations, a system configured to present an interface such as shown in FIG. 14 may use the location of a user when he or she makes a request and/or the time when the request is made, as an additional channel of data that would be used for properly responding to the request. For example, in some implementations, when a user selects a check in action, that action may be communicated to a server which would compare the location of the clinician with the locations of the appointments on the clinician's schedule to determine which appointment the user should be treated as checking in to. Similarly, in some implementations, when a user selects a call patient action, a server could compare the time the request was received with the user's schedule to determine the patient to whom the call should be placed. Of course, other implementations are also possible. For example, in some implementations information such as times and locations for appointments and/or patient numbers could be downloaded to a user's mobile device, and the mobile device could perform determinations such as the appointment clocked in to, or the patient to call locally, rather than relying on a server as described. Accordingly, the above description should be understood as illustrative only, and should not be treated as implying limitations on the protection provided by this document or any related document.

Figure 15:
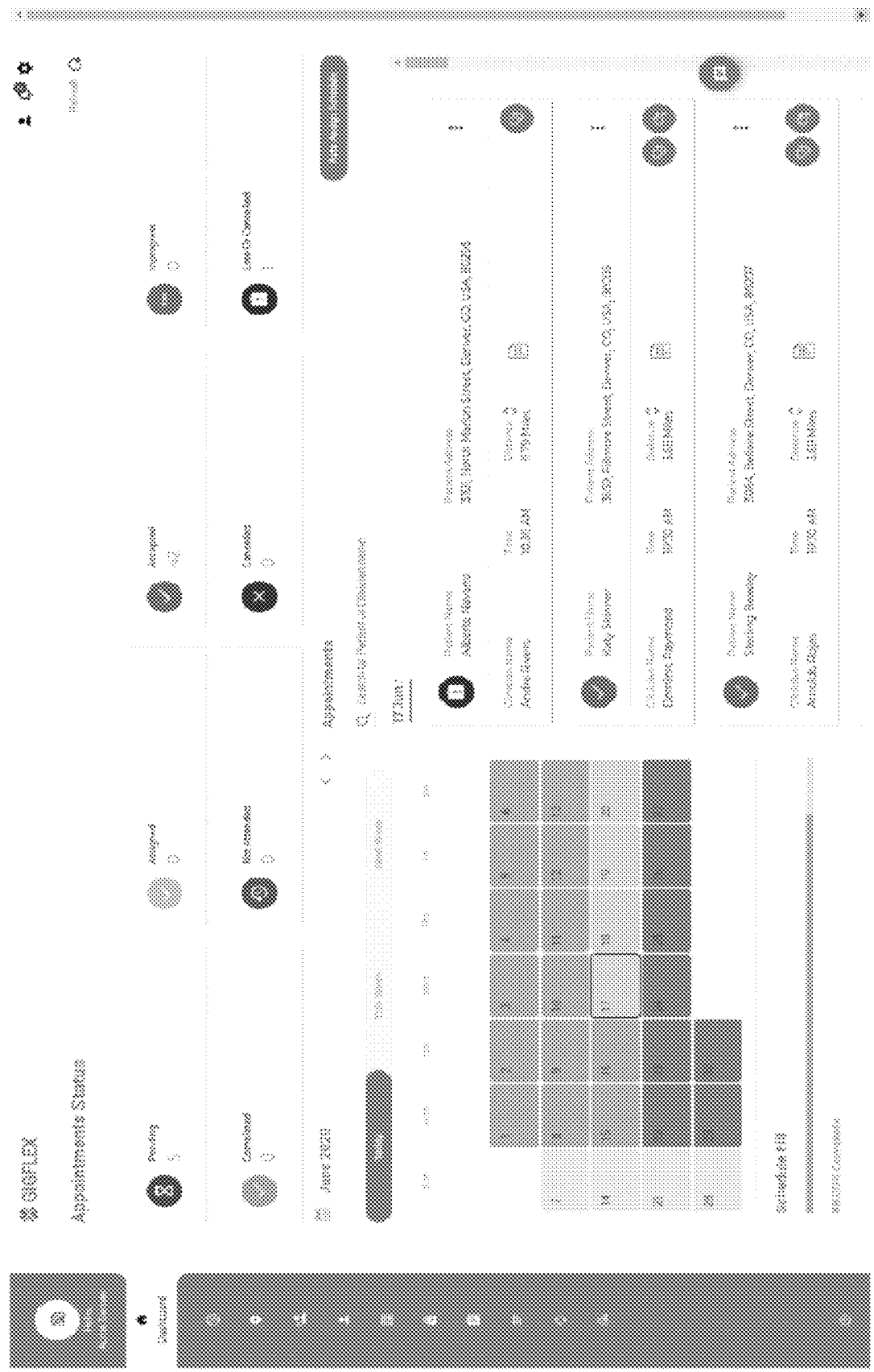
FIG. 15 illustrates a dashboard interface which may be presented to an administrator.
Figure 16:
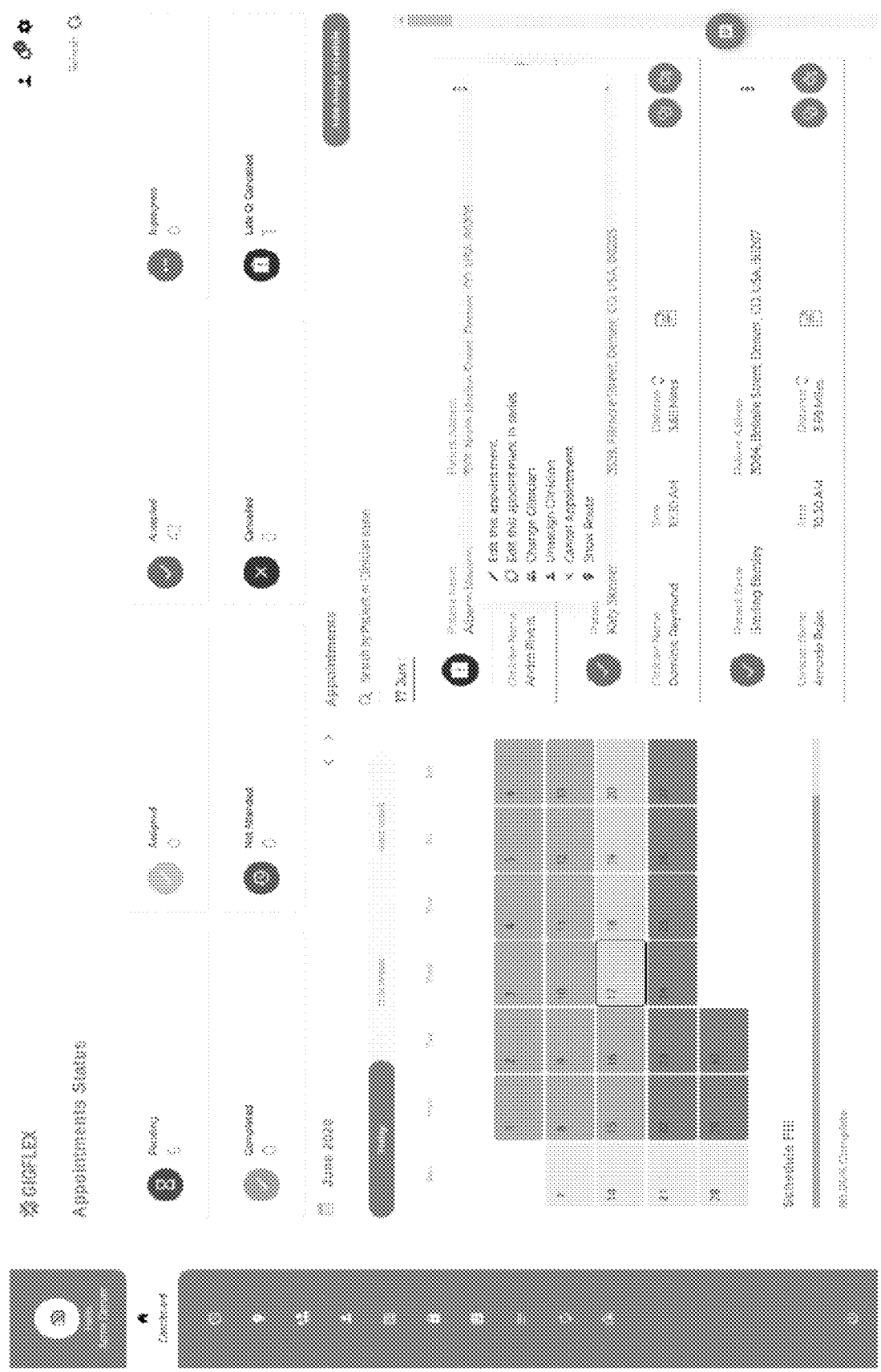
FIG. 16 illustrates an interface including a tools menu.
Figure 17:
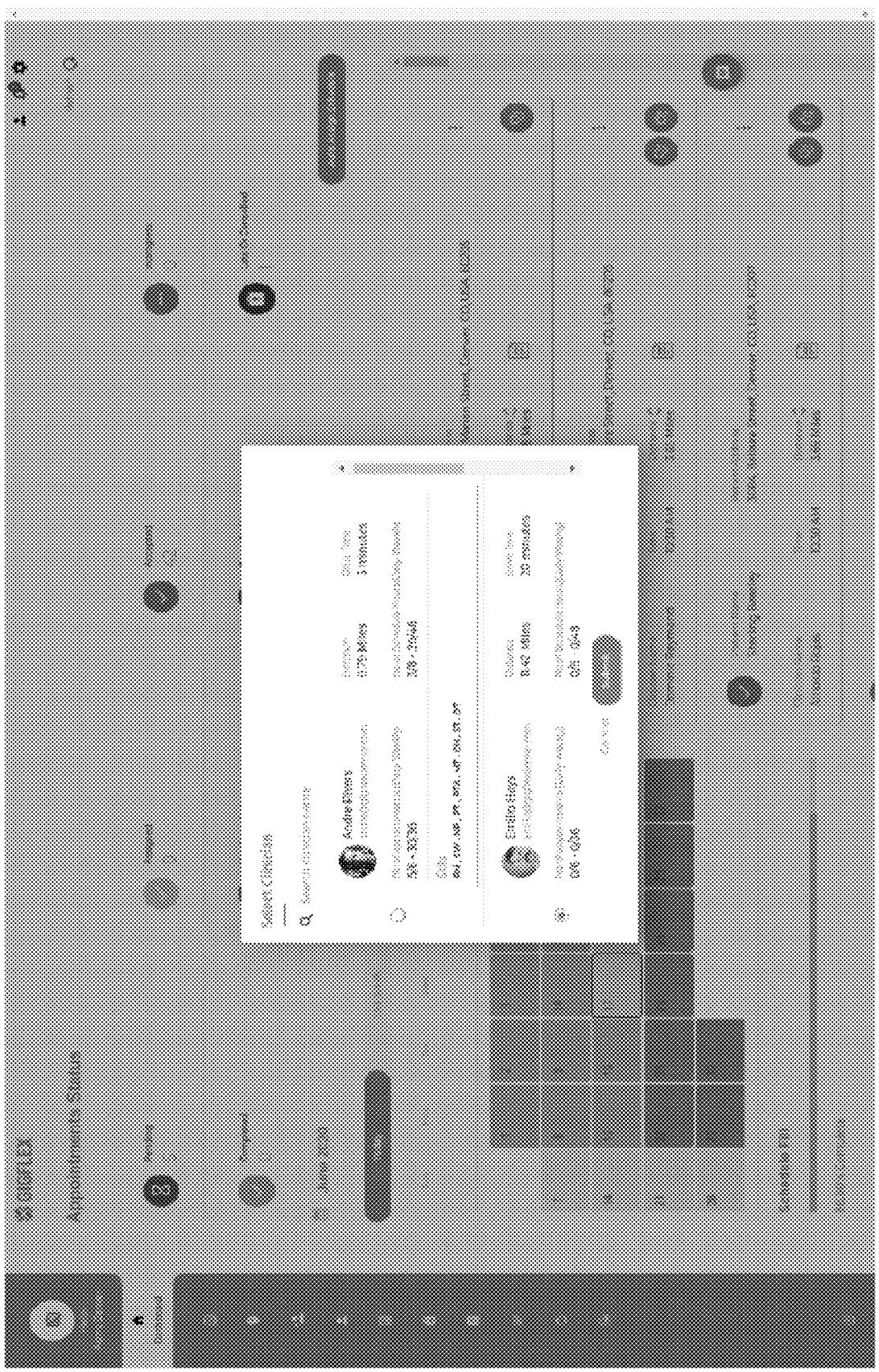
FIG. 17 illustrates an interface which could be used to edit an appointment.
Figure 18:
FIG. 18 illustrates a dashboard interface.

Continuing with the discussion of the figures, FIG. 15 illustrates a dashboard interface which may be presented to an administrator in some implementations. As illustrated in FIG. 15, such a dashboard interface may provide various information, such as the status of pending or upcoming events. In some implementations, such an interface may also allow a user to take actions to address potential issues related to a scheduled event. For example, in the interface of FIG. 15, Andre Rivers is identified as being late for, or having canceled, an appointment with patient Alberto Navarro. In some implementations, an administrator may be provided functionality to address this issue, such as by activating a tools menu, which could result in being presented with an interface such as shown in FIG. 16. The administrator may then select to change the clinician assigned to that appointment, at which point he or she could be presented with an interface such as shown in FIG. 17, which could be populated with a list of clinicians that were available (e.g., had clocked in and had a current location close enough to the relevant appointment that they could arrive there on time) and to whom the appointment could be reassigned. FIG. 18 illustrates how a dashboard interface such as shown in FIG. 15 may be updated based on a reassignment as described above.

Figure 19:
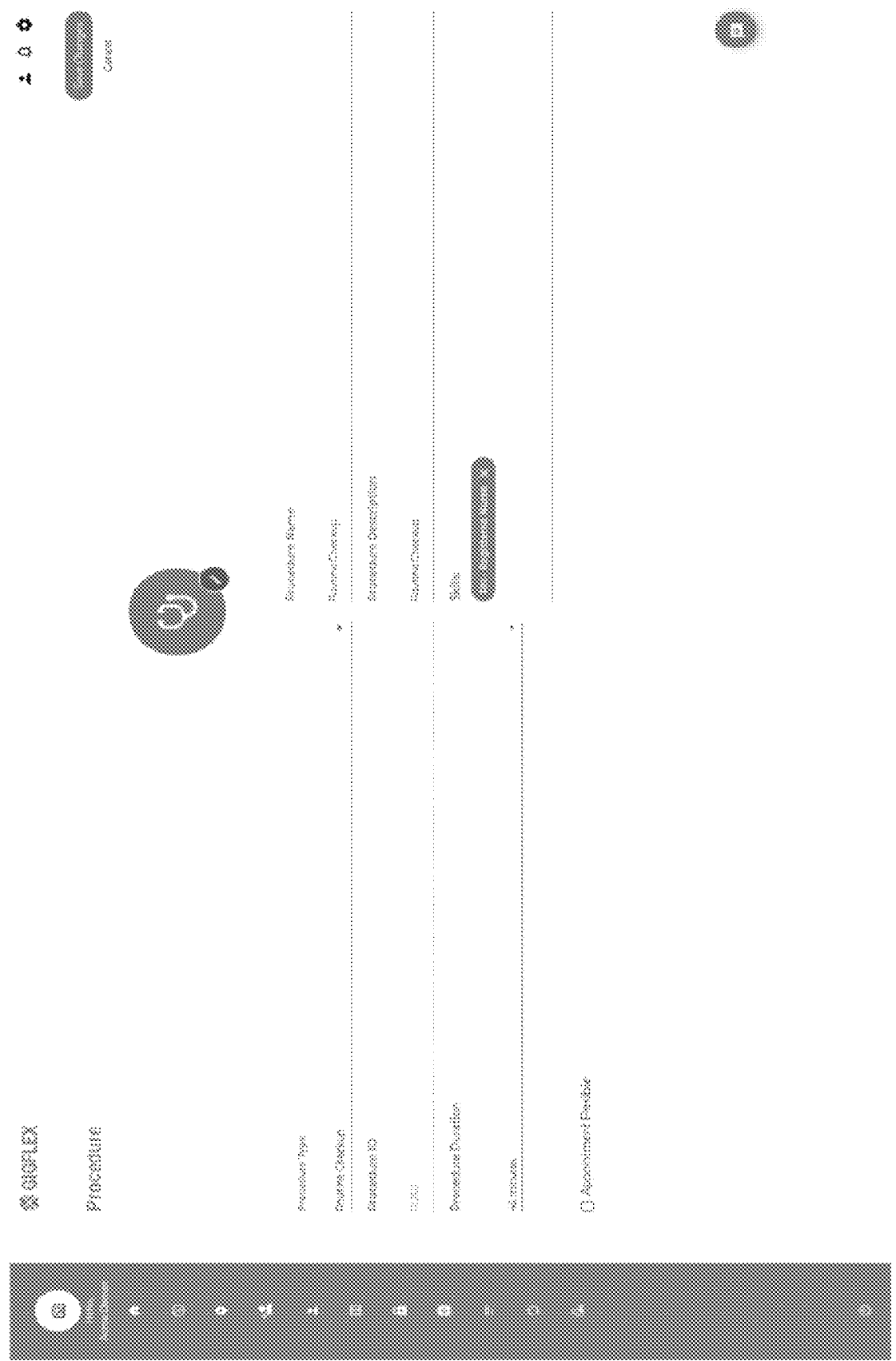
FIG. 19 illustrates an interface which may be used to define a type of procedure.
Figure 20:
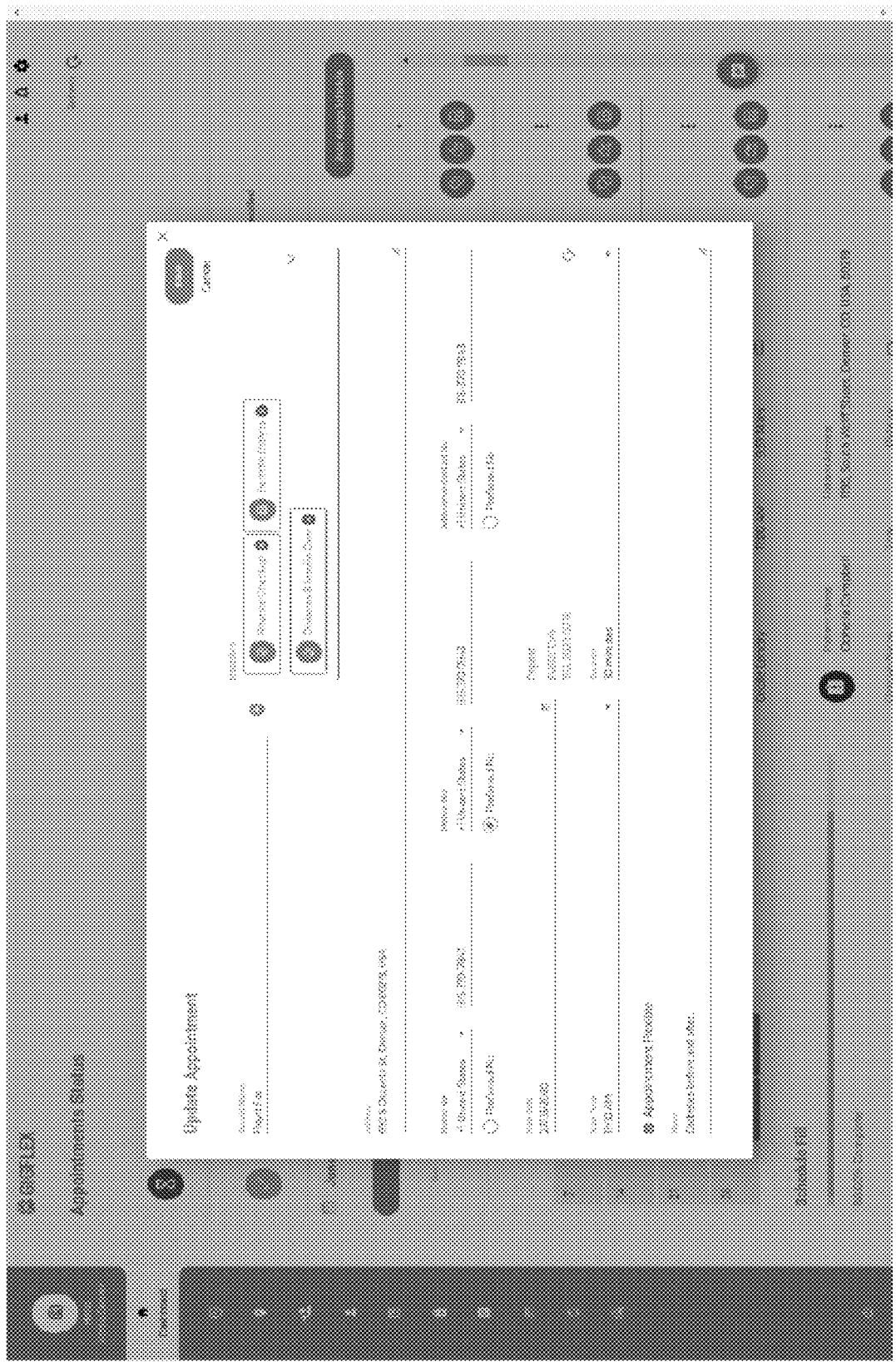
FIG. 20 illustrates an interface which could be used to define an appointment.

FIGS. 19 and 20 illustrate interfaces which may be used to support functionality such as described above in the context of FIGS. 10-18 through defining types and instances of events. FIG. 19 illustrates an interface which may be used to define a type of procedure, including the skills needed by the clinician who would perform it. FIG. 20 illustrates an interface which could be used to define an appointment, including through the assignment of one or more of the predefined procedure types to that appointment. Other interfaces, variations or functionality may also, or alternatively, be included in various embodiment and to further illustrate potential manners in which the disclosed technology may be implemented, the following examples are provided. It should be understood that the following examples are not intended to restrict the coverage of any claims that may be presented at any time in this application or in subsequent filings of this application. No disclaimer is intended and it is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented herein or in subsequent documents that include additional features beyond those referred to below, those additional features shall not be presumed to have been added for any reason relating to patentability.

Example 1

A system comprising: a) a server; b) a set of mobile computers, each of which is programmed with instructions operable to, when executed, transmit multiple forms of location information to, the server; and c) an administrator computer; wherein the server is programmed with a set of location determination routines and instructions operable to, when executed: i) determine a location for each mobile computer from the set of mobile computers by performing acts comprising: A) identifying an applicable location determination routine from the set of location determination routines; and B) determining the location for that mobile computer using the applicable location determination routine; ii) send data to the administrator computer operable to cause the administrator computer to present a map with a set of icons, wherein each icon: A) corresponds to a mobile computer from the set of mobile computers; and B) is displayed on the map at a position corresponding to the location determined for that icon's corresponding mobile computer.

Example 2

The system of example 1, wherein: a) the map comprises a plurality of predefined locations; b) the server stores data associating each of the plurality of predefined locations with a location determination routine from the set of location determination routines; and c) for each mobile computer from the set of mobile computers, determining the location for that mobile computer using the applicable location determination routine comprises identifying one of the plurality of predefined locations as the location for that mobile computer using the location determination routine associated with that one of the plurality of predefined locations.

Example 3

The system of example 2, wherein the set of location determination routines comprises a plurality of location determination routines which each use different logic operable to determine, for each mobile computer from the set of mobile computers, the location for that computer based on location information transmitted by that mobile computer to the server.

Example 4

The system of any of examples 2-3, wherein the server is programmed with instructions operable to, for each mobile computer from the set of mobile computers: a) determine a location conflict exists for that mobile computer based on identifying two or more conflicting predefined locations from the plurality of predefined locations for which identifying that conflicting predefined location as the location for that mobile computer is consistent with the location determination routine associated with that conflicting predefined location; and b) based on determining that the location conflict exists, overriding the location determination routines associated with all but one of the conflicting predefined locations.

Example 5

The system of any of examples 2-4, wherein the server is programmed with instructions operable to, when executed, send data to the administrator computer which is operable to cause the administrator computer to display an interface operable by a user of the administrator computer to perform acts comprising, for each of the plurality of predefined locations, associating that predefined location with its associated location determination routine.

Example 6

The system of any of examples 1-5, wherein a) the map is a reference map; b) the server stores data comprising: i) a first set of points; ii) a second set of points; iii) a semantic map corresponding to the reference map; c) each point from the first set of points has a location on the reference map; d) each point from the second set of points has a location on the semantic map corresponding to the reference map; e) each point from the second set of points corresponds to a point from the first set of points; f) for each mobile computer from the set of mobile computers, determining the location for that mobile computer using the applicable location determination routine comprises identifying a point from the first set of points as the location for that mobile computer; and g) the server computer is programmed with instructions operable to, when executed, send data to the administrator computer operable to cause the administrator computer to display the semantic map corresponding to the reference map with the set of icons, wherein, for each icon from the set of icons, that icon is presented at a point from the second set of points corresponding to the point from the first set of points identified as the location for the mobile computer corresponding to that icon

Example 7

The system of example 6, wherein the server is configured to send the administrator computer data operable to cause the administrator computer to present an interface operable by a user of the administrator computer to perform acts comprising: a) defining each point from the first set of points; and b) for each point from the first set of points, defining: i) a corresponding geofenced area on the reference map; and ii) the corresponding point from the second set of points.

Example 8

The system of any of examples 6-7, wherein: a) the reference map and the semantic map corresponding to the reference map both include depictions of a plurality of named areas; b) for a first named area from the plurality of named areas, the depiction of that named area in the reference map has a first orientation, and the depiction of that named area in the semantic map has a second orientation which differs from the first orientation; c) for a second named area from the plurality of named areas, the depiction of that named area in the reference map has a first size, and the depiction of that named area in the semantic map has a second size which differs from the first size; d) for a third named area from the plurality of named areas, the depiction of that named area in the reference map has a first shape, and the depiction of that named area in the semantic map has a second shape which differs from the first shape; and e) for a fourth named area from the plurality of named areas, the depiction of that named area in the reference map has a first location, and the depiction of that named area in the semantic map has a second location which differs from the first location.

Example 9

The system of any of examples 1-8, wherein: a) the the administrator computer is configured to present the map in a map interface which comprises a temporal control; b) the temporal control is operable to allow a user of the administrator computer to specify a future time; and c) the map interface is configured to, in response to specification of the future time, update the map to indicate where users associated with the plurality of mobile computers are projected to be located at the future time.

Example 10

The system of any of examples 1-9, wherein each of the mobile computers from the plurality of mobile computers is configured to: a) determine a locally determined location for that mobile computer; b) compare the locally determined location with a geofenced area; c) selectivley send the locally determined location to the server as location information based on that mobile computer moving into or out of the geofenced area.

Example 11

A method comprising a server programmed with a set of location determination routines performing a set of acts comprising: a) determining a location for each mobile computer from a set of mobile computers by performing acts comprising: i) identifying an applicable location determination routine from the set of location determination routines; and ii) determining the location for that mobile computer using the applicable location determination routine; and b) sending data to an administrator computer operable to cause the administrator computer to present a map with a set of icons, wherein each icon: i) corresponds to a mobile computer from the set of mobile computers; and ii) is displayed on the map at a position corresponding to the location determined for that icon's corresponding mobile computer.

Example 12

The method of example 11, wherein: a) the map comprises a plurality of predefined locations; b) the server stores data associating each of the plurality of predefined locations with a location determination routine from the set of location determination routines; and c) for each mobile computer from the set of mobile computers, determining the location for that mobile computer using the applicable location determination routine comprises identifying one of the plurality of predefined locations as the location for that mobile computer using the location determination routine associated with that one of the plurality of predefined locations.

Example 13

The method of example 12, wherein the set of location determination routines comprises a plurality of location determination routines which each use different logic operable to determine, for each mobile computer from the set of mobile computers, the location for that computer based on location information received from that mobile computer by the server.

Example 14

The method of any of examples 12-13, wherein, for at least one mobile computer from the set of mobile computers, determining the location for that mobile computer comprises: a) determining a location conflict exists for that mobile computer based on identifying two or more conflicting predefined locations from the plurality of predefined locations for which identifying that conflicting predefined location as the location for that mobile computer is consistent with the location determination routine associated with that conflicting predefined location; and b) based on determining that the location conflict exists, overriding the location determination routines associated with all but one of the conflicting predefined locations.

Example 15

The method of any of examples 12-14, wherein the method comprises the server sending data to the administrator computer which is operable to cause the administrator computer to display an interface operable by a user of the administrator computer to perform acts comprising, for each of the plurality of predefined locations, associating that predefined location with its associated location determination routine.

Example 16

The method of any of examples 11-15, wherein a) the map is a reference map; b) the server stores data comprising: i) a first set of points; ii) a second set of points; and iii) a semantic map corresponding to the reference map; c) each point from the first set of points has a location on the reference map; d) each point from the second set of points has a location on the semantic map corresponding to the reference map; e) each point from the second set of points corresponds to a point from the first set of points; f) for each mobile computer from the set of mobile computers, determining the location for that mobile computer using the applicable location determination routine comprises identifying a point from the first set of points as the location for that mobile computer; and g) the method comprises the server sending data to the administrator computer operable to cause the administrator computer to display the semantic map corresponding to the reference map with the set of icons, wherein, for each icon from the set of icons, that icon is presented at a point from the second set of points corresponding to the point from the first set of points identified as the location for the mobile computer corresponding to that icon Example 17

The method of example 16, wherein the method comprises the server sending the administrator computer data operable to cause the administrator computer to present an interface operable by a user of the administrator computer to perform acts comprising: a) defining each point from the first set of points; and b) for each point from the first set of points, defining: i) a corresponding geofenced area on the reference map; and ii) the corresponding point from the second set of points.

Example 18

The method of any of examples 16-17, wherein: a) the reference map and the semantic map corresponding to the reference map both include depictions of a plurality of named areas; b) for a first named area from the plurality of named areas, the depiction of that named area in the reference map has a first orientation, and the depiction of that named area in the semantic map has a second orientation which differs from the first orientation; c) for a second named area from the plurality of named areas, the depiction of that named area in the reference map has a first size, and the depiction of that named area in the semantic map has a second size which differs from the first size; d) for a third named area from the plurality of named areas, the depiction of that named area in the reference map has a first shape, and the depiction of that named area in the semantic map has a second shape which differs from the first shape; and e) for a fourth named area from the plurality of named areas, the depiction of that named area in the reference map has a first location, and the depiction of that named area in the semantic map has a second location which differs from the first location.

Example 19

The method of any of examples 11-18, wherein: a) the method comprises the server sending data to the administrator computer which is operable to cause the administrator computer to present the map in a map interface which comprises a temporal control; b) the temporal control is operable to allow a user of the administrator computer to specify a future time; and c) the map interface is configured to, in response to specification of the future time, update the map to indicate where users associated with the plurality of mobile computers are projected to be located at the future time.

Example 20

The method of any of examples 11-19, wherein each of the mobile computers from the plurality of mobile computers is configured to: a) determine a locally determined location for that mobile computer; b) compare the locally determined location with a geofenced area; c) selectivley send the locally determined location to the server as location information based on that mobile computer moving into or out of the geofenced area.

Example 21

A system comprising: a) a server; b) a plurality of mobile computers, each of which is associated with a user and is located remotely from the server; and c) an administrator computer located remotely from the server; wherein: i) each of the mobile computers comprises instructions stored on a computer readable medium and operable to, when executed, determine a location for that mobile computer; ii) the server is configured to: A) send data to the administrator computer operable to cause the administrator computer to present a map interface comprising a topographical map with a plurality of icons corresponding to the plurality of mobile computers; B) for each mobile computer from the plurality of mobile computers: I) receive the location for mobile computer; II) compare the location for that mobile computer with a required location for the user associated with that mobile computer; and III) based on the comparison, determine if an incompatibility exist between the location for that mobile computer and the required location for the user associated with that mobile computer.

Example 22

The system of example 21, wherein: a) the map interface comprises a temporal control; b) the temporal control is operable to allow a user to specify a future time; and c) the map interface is configured to, in response to specification of the future time, update the topographical map to indicate where the users associated with the plurality of mobile computers are projected to be located at the future time.

Example 23

The system of any of examples 21-22, wherein each of the mobile computers is configured to compare its location with a geofenced area, and to only send its location to the server when the mobile computer moves into or out of the geofenced area.

As noted, the above examples, as well as the other descriptive material set forth herein is intended to be illustrative only. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, a statement that something is "based on" something else should be understood to mean that something is determined at least in part by the thing that it is indicated as being "based on." When something is required to be completely determined by a thing, it will be described as being "based EXCLUSIVELY on" the thing.

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed, or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc.).

When used in the claims, "database" should be understood be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, "remote" should be understood to refer to the relationship between entities which are physically distant from one another, such as between entities that communicate over a network.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc.) of the thing doing the "storing" for a period of time, however brief Accordingly, what is claimed is:
1. A system comprising:
a) a server;
b) a set of mobile computers, each of which is programmed with instructions operable to, when executed, transmit multiple forms of location information to the server; and
c) an administrator computer;
wherein the server is programmed with a set of location determination routines and instructions operable to, when executed:
  i) determine a location for each mobile computer from the set of mobile computers by performing acts comprising:
    A) identifying an applicable location determination routine from the set of location determination routines;

B) determining the location for that mobile computer using the applicable location determination routine;

C) determine a location conflict exists for that mobile computer based on identifying two or more conflicting predefined locations from a plurality of predefined locations for which identifying that conflicting predefined location as the location for that mobile computer is consistent with the location determination routine associated with that conflicting predefined location; and D) based on determining that the location conflict exists, overriding the location determination routines associated with all but one of the conflicting predefined locations; and ii) send data to the administrator computer operable to cause the administrator computer to present a map with a set of icons, wherein each icon:

A) corresponds to a mobile computer from the set of mobile computers; and

B) is displayed on the map at a position corresponding to the location determined for that icon's corresponding mobile computer;

wherein:

A) the map comprises the plurality of predefined locations;

B) the server stores data associating each of the plurality of predefined locations with a location determination routine from the set of location determination routines; and C) for each mobile computer from the set of mobile computers, determining the location for that mobile computer using the applicable location determination routine comprises identifying one of the plurality of predefined locations as the location for that mobile computer using the location determination routine associated with that one of the plurality of predefined locations.

2. The system of claim 1, wherein the set of location determination routines comprises a plurality of location determination routines which each use different logic operable to determine, for each mobile computer from the set of mobile computers, the location for that computer based on location information transmitted by that mobile computer to the server.

3. The system of claim 1, wherein the server is programmed with instructions operable to, when executed, send data to the administrator computer which is operable to cause the administrator computer to display an interface operable by a user of the administrator computer to perform acts comprising, for each of the plurality of predefined locations, associating that predefined location with its associated location determination routine.

4. A system comprising:
a) a server storing data comprising;
  i) a first set of points;
  ii) a second set of points; and
  iii) a semantic map corresponding to a reference map;
wherein
  i) each point from the first set of points has a location on the reference map;
  ii) each point from the second set of points has a location on the semantic map corresponding to the reference map; and
  iii). each point from the second set of points corresponds to a point from the first set of points;

b) a set of mobile computers, each of which is programmed with instructions operable to, when executed, transmit multiple forms of location information to the server; and c) an administrator computer;

wherein the server is programmed with a set of location determination routines and instructions operable to, when executed:

i) determine a location for each mobile computer from the set of mobile computers by performing acts comprising:

A) identifying an applicable location determination routine from the set of location determination routines; and B) determining the location for that mobile computer using the applicable location determination routine, comprising identifying a point from the first set of points as the location for that mobile computer; and ii) send data to the administrator computer operable to cause the administrator computer to present the semantic map corresponding to the reference map with a set of icons, wherein each icon:

A) corresponds to a mobile computer from the set of mobile computers; and

B) is displayed on the reference map at a position corresponding to the location determined for that icon's corresponding mobile computer; and wherein, each icon, from the set of icons is:

A) presented at a point from the second set of points corresponding to the point from the first set of points identified as the location for the mobile computer corresponding to that icon.

5. The system of claim 4, wherein the server is configured to send the administrator computer data operable to cause the administrator computer to present an interface operable by a user of the administrator computer to perform acts comprising:

a) defining each point from the first set of points; and b) for each point from the first set of points, defining:
  i) a corresponding geofenced area on the reference map; and
  ii) the corresponding point from the second set of points.

6. The system of claim 4, wherein:

a) the reference map and the semantic map corresponding to the reference map both include depictions of a plurality of named areas;

b) for a first named area from the plurality of named areas, the depiction of that named area in the reference map has a first orientation, and the depiction of that named area in the semantic map has a second orientation which differs from the first orientation;

c) for a second named area from the plurality of named areas, the depiction of that named area in the reference map has a first size, and the depiction of that named area in the semantic map has a second size which differs from the first size;

d) for a third named area from the plurality of named areas, the depiction of that named area in the reference map has a first shape, and the depiction of that named area in the semantic map has a second shape which differs from the first shape; and e) for a fourth named area from the plurality of named areas, the depiction of that named area in the reference map has a first location, and the depiction of that named area in the semantic map has a second location which differs from the first location.

7. The system of claim 4, wherein each of the mobile computers from the set of mobile computers is configured to:
   a) determine a locally determined location for that mobile computer;
   b) compare the locally determined location with a geofenced area; and
   c) selectivley send the locally determined location to the server as location information based on that mobile computer moving into or out of the geofenced area.

8. A system comprising:
   a) a server;
   b) a set of mobile computers, each of which is programmed with instructions operable to, when executed, transmit multiple forms of location information to the server; and
   c) an administrator computer;
   wherein the server is programmed with a set of location determination routines and instructions operable to, when executed:
   i) determine a location for each mobile computer from the set of mobile computers by performing acts comprising:
      A) identifying an applicable location determination routine from the set of location determination routines; and
      B) determining the location for that mobile computer using the applicable location determination routine; and
   ii) send data to the administrator computer operable to cause the administrator computer to present a map with a set of icons, in a map interface which comprises a temporal control, wherein each icon:
      A) corresponds to a mobile computer from the set of mobile computers;
      B) is displayed on the map at a position corresponding to the location determined for that icon's corresponding mobile computer; and
   wherein
      a) the temporal control is operable to allow a user of the administrator computer to specify a future time; and
      b) the map interface is configured to, in response to specification of the future time, update the map to indicate where users associated with the set of mobile computers are projected to be located at the future time.

9. The system of claim 1, wherein each of the mobile computers from the set of mobile computers is configured to:
   a) determine a locally determined location for that mobile computer;
   b) compare the locally determined location with a geofenced area; and
   c) selectivley send the locally determined location to the server as location information based on that mobile computer moving into or out of the geofenced area.

10. The system of claim 8, wherein each of the mobile computers from the set of mobile computers is configured to:
    a) determine a locally determined location for that mobile computer;
    b) compare the locally determined location with a geofenced area; and
    c) selectivley send the locally determined location to the server as location information based on that mobile computer moving into or out of the geofenced area.

11. A method comprising a server programmed with a set of location determination routines performing a set of acts comprising:
    a) determining a location for each mobile computer from a set of mobile computers by performing acts comprising:
       i) identifying an applicable location determination routine from the set of location determination routines;
       ii) determining the location for that mobile computer using the applicable location determination routine;
       iii) determining a location conflict exists for that mobile computer based on identifying two or more conflicting predefined locations from a plurality of predefined locations for which identifying that conflicting predefined location as the location for that mobile computer is consistent with the location determination routine associated with that conflicting predefined location; and
       iv) based on determining that the location conflict exists, overriding the location determination routines associated with all but one of the conflicting predefined locations; and
    b) sending data to an administrator computer operable to cause the administrator computer to present a map with a set of icons, wherein each icon:
       i) corresponds to a mobile computer from the set of mobile computers; and
       ii) is displayed on the map at a position corresponding to the location determined for that icon's corresponding mobile computer.
    wherein:
    a) the map comprises the plurality of predefined locations;
    b) the server stores data associating each of the plurality of predefined locations with a location determination routine from the set of location determination routines; and
    c) for each mobile computer from the set of mobile computers, determining the location for that mobile computer using the applicable location determination routine comprises identifying one of the plurality of predefined locations as the location for that mobile computer using the location determination routine associated with that one of the plurality of predefined locations.

12. The method of claim 11, wherein the set of location determination routines comprises a plurality of location determination routines which each use different logic operable to determine, for each mobile computer from the set of mobile computers, the location for that computer based on location information received from that mobile computer by the server.

13. The method of claim 11, wherein the method comprises the server sending data to the administrator computer which is operable to cause the administrator computer to display an interface operable by a user of the administrator computer to perform acts comprising, for each of the plurality of predefined locations, associating that predefined location with its associated location determination routine.

14. The method of claim 11, wherein each of the mobile computers from the set of mobile computers is configured to:
    a) determine a locally determined location for that mobile computer;

b) compare the locally determined location with a geofenced area; and c) selectivley send the locally determined location to the server as location information based on that mobile computer moving into or out of the geofenced area.

15. A method comprising a server programmed with a set of location determination routines performing a set of acts comprising:
   a) determining a location for each mobile computer from a set of mobile computers by performing acts comprising:
      i) identifying an applicable location determination routine from the set of location determination routines; and
      ii) determining the location for that mobile computer using the applicable location determination routine; and
   b) sending data to an administrator computer operable to cause the administrator computer to present a map refere with a set of icons, wherein each icon:
      i) corresponds to a mobile computer from the set of mobile computers; and
      ii) is displayed on the map at a position corresponding to the location determined for that icon's corresponding mobile computer;
   wherein
      i) the map is a reference map;
      ii) the server stores data comprising:
         1) a first set of points;
         2) a second set of points; and
         3) a semantic map corresponding to the reference map;
      iii) each point from the first set of points has a location on the reference map;
      iv) each point from the second set of points has a location on the semantic map corresponding to the reference map;
      v) each point from the second set of points corresponds to a point from the first set of points;
      iv) for each mobile computer from the set of mobile computers, determining the location for that mobile computer using the applicable location determination routine comprises identifying a point from the first set of points as the location for that mobile computer; and
      vii) the method comprises the server sending data to the administrator computer operable to cause the administrator computer to display the semantic map corresponding to the reference map with the set of icons, wherein, for each icon from the set of icons, that icon is presented at a point from the second set of points corresponding to the point from the first set of points identified as the location for the mobile computer corresponding to that icon.

16. The method of claim 15, wherein the method comprises the server sending the administrator computer data operable to cause the administrator computer to present an interface operable by a user of the administrator computer to perform acts comprising:
   a) defining each point from the first set of points; and
   b) for each point from the first set of points, defining:
      i) a corresponding geofenced area on the reference map; and
      ii) the corresponding point from the second set of points.

17. The method of claim 15, wherein:
   a) the reference map and the semantic map corresponding to the reference map both include depictions of a plurality of named areas;
   b) for a first named area from the plurality of named areas, the depiction of that named area in the reference map has a first orientation, and the depiction of that named area in the semantic map has a second orientation which differs from the first orientation;
   c) for a second named area from the plurality of named areas, the depiction of that named area in the reference map has a first size, and the depiction of that named area in the semantic map has a second size which differs from the first size;
   d) for a third named area from the plurality of named areas, the depiction of that named area in the reference map has a first shape, and the depiction of that named area in the semantic map has a second shape which differs from the first shape; and
   e) for a fourth named area from the plurality of named areas, the depiction of that named area in the reference map has a first location, and the depiction of that named area in the semantic map has a second location which differs from the first location.

18. The method of claim 15, wherein each of the mobile computers from the set of mobile computers is configured to:
   a) determine a locally determined location for that mobile computer;
   b) compare the locally determined location with a geofenced area; and
   c) selectivley send the locally determined location to the server as location information based on that mobile computer moving into or out of the geofenced area.

19. A method comprising a server programmed with a set of location determination routines performing a set of acts comprising:
   a) determining a location for each mobile computer from a set of mobile computers by performing acts comprising:
      i) identifying an applicable location determination routine from the set of location determination routines; and
      ii) determining the location for that mobile computer using the applicable location determination routine; and
   b) sending data to an administrator computer operable to cause the administrator computer to present a map with a set of icons, in a map interface which comprises a temporal control, wherein each icon:
      i) corresponds to a mobile computer from the set of mobile computers; and
      ii) is displayed on the map at a position corresponding to the location determined for that icon's corresponding mobile computer; and
   wherein
      a) the temporal control is operable to allow a user of the administrator computer to specify a future time; and
      b) the map interface is configured to, in response to specification of the future time, update the map to indicate where users associated with the set of mobile computers are projected to be located at the future time.

20. The method of claim 19, wherein each of the mobile computers from the set of mobile computers is configured to:

a) determine a locally determined location for that mobile computer;
b) compare the locally determined location with a geofenced area; and
c) selectivley send the locally determined location to the server as location information based on that mobile computer moving into or out of the geofenced area.

* * * * *